US009898159B2

(12) United States Patent
Suzuki

(10) Patent No.: US 9,898,159 B2
(45) Date of Patent: Feb. 20, 2018

(54) ARRANGEMENT AND DISPLAY OF GRAPHICAL ELEMENTS BASED ON DESIGNATION OF A POINT

(71) Applicant: Sony Corporation, Tokyo (JP)

(72) Inventor: Toshikazu Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 231 days.

(21) Appl. No.: 14/391,456

(22) PCT Filed: Mar. 12, 2013

(86) PCT No.: PCT/JP2013/056804
§ 371 (c)(1),
(2) Date: Oct. 9, 2014

(87) PCT Pub. No.: WO2013/157330
PCT Pub. Date: Oct. 24, 2013

(65) Prior Publication Data
US 2015/0089407 A1     Mar. 26, 2015

(30) Foreign Application Priority Data
Apr. 20, 2012   (JP) .................... 2012-096456

(51) Int. Cl.
    *G06F 3/048*        (2013.01)
    *G06F 3/0481*      (2013.01)
    *G06F 3/0482*      (2013.01)
    *G06F 3/0488*      (2013.01)
    *G06F 3/0484*      (2013.01)

(52) U.S. Cl.
CPC ........ *G06F 3/04817* (2013.01); *G06F 3/0482* (2013.01); *G06F 3/04842* (2013.01); *G06F 3/04883* (2013.01); *G06F 3/04886* (2013.01)

(58) Field of Classification Search
CPC .. G06F 3/048–3/048831; G06F 17/212; G06F 17/24
See application file for complete search history.

(56) References Cited

U.S. PATENT DOCUMENTS

| | | | | |
|---|---|---|---|---|
| 5,898,435 A | * | 4/1999 | Nagahara | G06F 3/04815 715/841 |
| 7,933,395 B1 | * | 4/2011 | Bailly | G06F 3/04815 379/201.04 |
| 2004/0070608 A1 | * | 4/2004 | Saka | H04L 29/06 715/748 |
| 2004/0212617 A1 | * | 10/2004 | Fitzmaurice | G06F 3/0481 345/440 |

(Continued)

FOREIGN PATENT DOCUMENTS

| | | |
|---|---|---|
| JP | 2011-053790 A | 3/2011 |
| JP | 2011-174744 A | 9/2011 |
| WO | 2011/048977 A1 | 4/2011 |

OTHER PUBLICATIONS

International Search Report corresponding to PCT/JP2013/056804, dated May 14, 2013; 1 pg.

*Primary Examiner* — Claudia Dragoescu
(74) *Attorney, Agent, or Firm* — Chip Law Group

(57) ABSTRACT

Provided is an information processing apparatus including a detection unit configured to detect a position of a first point that has been designated, and a control unit configured to display an icon at a position designated by indicating a direction from the first point.

17 Claims, 21 Drawing Sheets

(56) References Cited

U.S. PATENT DOCUMENTS

| | | | |
|---|---|---|---|
| 2008/0174570 A1* | 7/2008 | Jobs | G06F 3/0488 |
| | | | 345/173 |
| 2009/0007012 A1* | 1/2009 | Mandic | G06F 3/0481 |
| | | | 715/810 |
| 2009/0327963 A1* | 12/2009 | Mouilleseaux | G06F 3/04883 |
| | | | 715/834 |
| 2010/0011314 A1* | 1/2010 | Peterson | G06F 3/0481 |
| | | | 715/779 |
| 2011/0314035 A1* | 12/2011 | Brunet | G06F 17/30132 |
| | | | 707/756 |
| 2012/0212450 A1 | 8/2012 | Takami | |

* cited by examiner

STATE 3

STATE 4

STATE 5

STATE 6

HOLD DOWN→DRAGGING OPERATION

ARRANGEMENT AND DISPLAY OF GRAPHICAL ELEMENTS BASED ON DESIGNATION OF A POINT

CROSS-REFERENCE TO RELATED APPLICATION

The present application is a national phase entry under 35 U.S.C. § 371 of International Application No. PCT/JP2013/056804 filed Mar. 12, 2013, published on Oct. 24, 2013 as WO 2013/157330 A1, which claims priority from Japanese Patent Application No. JP 2012-096456 filed in the Japanese Patent Office on Apr. 20, 2012.

TECHNICAL FIELD

The present disclosure relates to an information processing apparatus, an information processing method, and a program.

BACKGROUND ART

Various information processing apparatuses are today in widespread use. The information processing apparatuses are gaining various sophisticated functions. When information processing apparatuses are equipped with a large number of functions, various approaches are possible for starting a particular function of them. For example, Patent Literature 1 discloses a navigation device that provides a hierarchical menu screen. When a particular function is started in the navigation device, a user makes allowance for a category to which a desired function belongs in the hierarchical menu and then selects a plurality of categories or items. Patent Literature 2 discloses an information processing terminal that provides a home screen displaying a plurality of icons each of which has a function of a shortcut to a particular function.

CITATION LIST

Patent Literature

Patent Literature 1: JP 2011-174744A
Patent Literature 2: JP 2011-053790A

SUMMARY OF INVENTION

Technical Problem

In view of the usability of information processing apparatuses for users, the operability is important. It would be, however, complicated to start a particular function with an increase in the number of functions implemented in information processing apparatuses. The present disclosure shows a novel and improved information processing apparatus, information processing method, and program that can enhance the operability for users.

Solution to Problem

According to the present disclosure, there is provided an information processing apparatus including a detection unit configured to detect a position of a first point that has been designated, and a control unit configured to display an icon at a position designated by indicating a direction from the first point.

According to the present disclosure, there is provided an information processing method including detecting a position of a first point that has been designated, and displaying an icon at a position designated by indicating a direction from the first point.

According to the present disclosure, there is provided a program for causing a computer to function as an information processing apparatus, the information processing apparatus including a detection unit configured to detect a position of a first point that has been designated, and a control unit configured to display an icon at a position designated by indicating a direction from the first point.

Advantageous Effects of Invention

According to the present disclosure, it becomes possible to enhance the operability for users.

DESCRIPTION OF EMBODIMENTS

Hereinafter, preferred embodiments of the present invention will be described in detail with reference to the appended drawings. Note that, in this description and the drawings, structural elements that have substantially the same function and structure are denoted with the same reference signs, and repeated explanation is omitted.

Note that, in this description and the drawings, structural elements that have substantially the same function and structure are sometimes distinguishably denoted with different numbers via hyphens after the same reference sign. For example, structural elements that have substantially the same function and structure are distinguished like an icon I-1 and an icon I-2 as necessary. However, when there is no need in particular to distinguish structural elements that have substantially the same function and structure, the same reference sign alone is attached. For example, when there is no need to distinguish the icon I-1 from the icon I-2, they are referred to as icon I.

Note that, in this description and the drawings, structural elements that have substantially the same function and structure are sometimes distinguished from each other using different alphabets after the same reference sign. For example, structural elements that have substantially the same function and structure are distinguished like a terminal apparatus 10A and a terminal apparatus 10B as necessary. However, when there is no need in particular to distinguish structural elements that have substantially the same function and structure, the same reference sign alone is attached. For example, when there is no need to distinguish the terminal apparatus 10A from the terminal apparatus 10B, they are referred to as terminal apparatus 10.

The description will be made in the following order.
1. Overview
2. Functional Configuration Example
3. Display of Icons
4. Editing Group of Icons to Be Displayed
5. Selection of Icon
6. Operation Example
7. Hardware Configuration Example
8. Modified Example <1. Overview>

Figure 1:
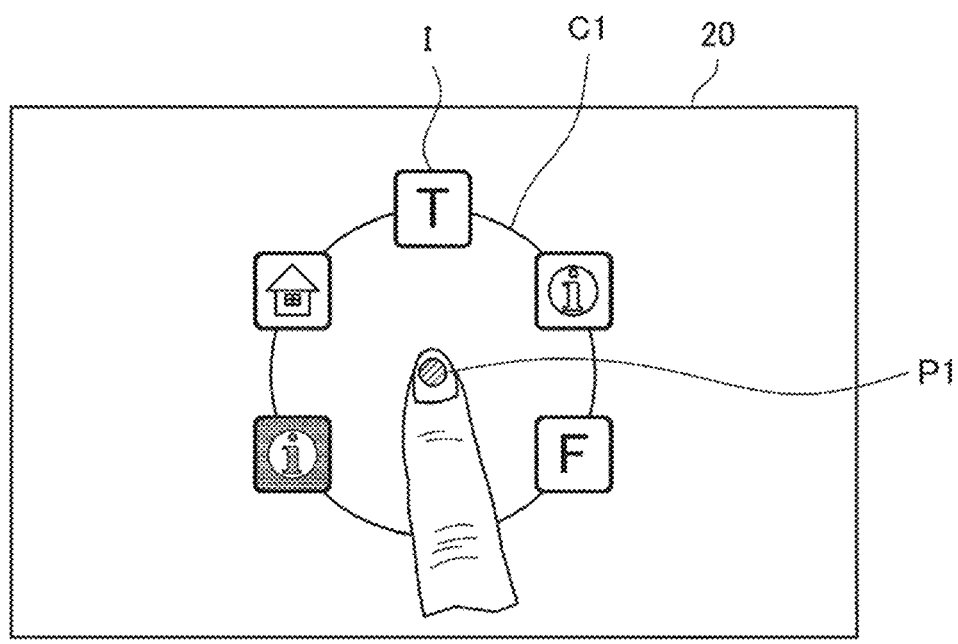
FIG. 1 is an explanatory diagram schematically illustrating an example of a display screen displayed by a terminal apparatus according to an embodiment of the present disclosure.
Figure 2:
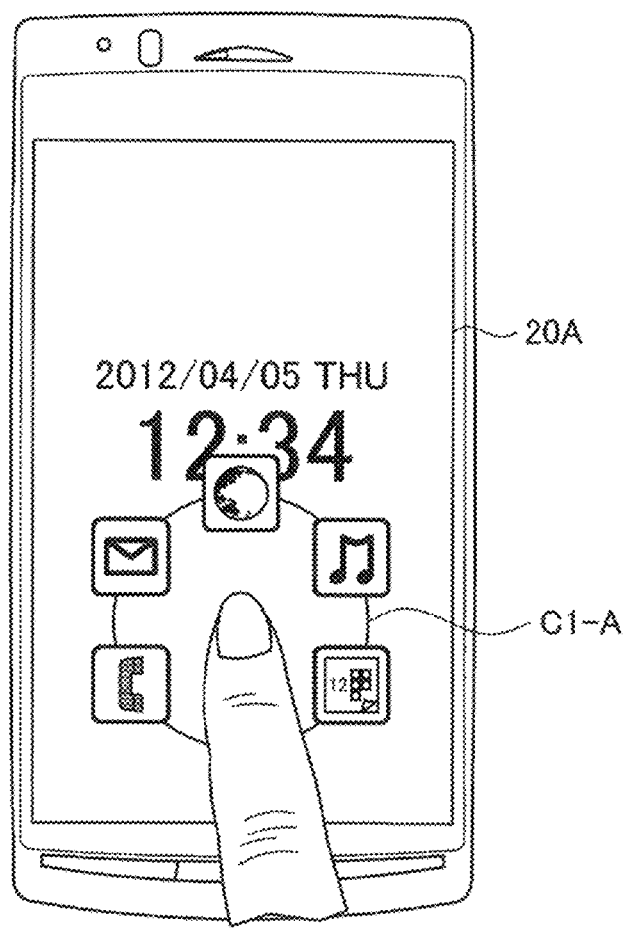
FIG. 2 is an explanatory diagram illustrating an example of icons displayed on a home screen by the terminal apparatus according to the present embodiment.
Figure 3:
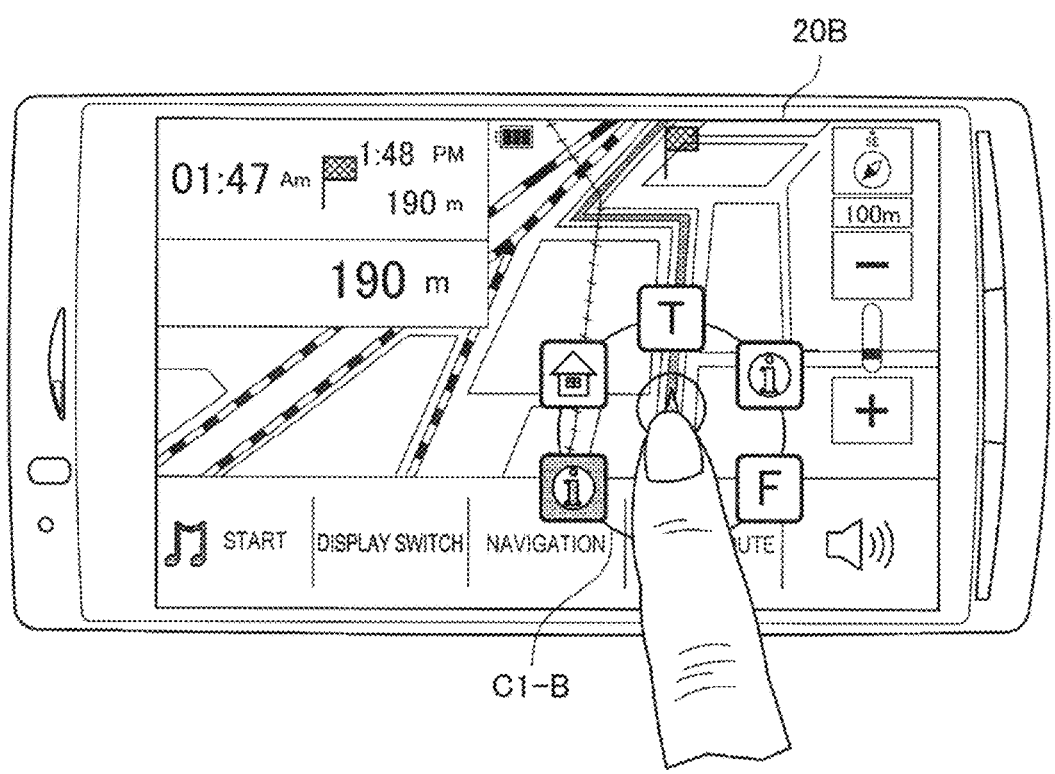
FIG. 3 is an explanatory diagram illustrating an example of icons displayed on a navigation screen by the terminal apparatus according to the present embodiment.

An overview of a display control function of a terminal apparatus 10 according to an embodiment of the present disclosure will be described with reference to FIGS. 1 to 3. FIG. 1 is an explanatory diagram schematically illustrating an example of a display screen displayed by the terminal apparatus according to an embodiment of the present disclosure. FIG. 2 is an explanatory diagram illustrating an example of icons displayed on a home screen by the terminal apparatus according to the present embodiment. FIG. 3 is an explanatory diagram illustrating an example of icons displayed on a navigation screen by the terminal apparatus according to the present embodiment.

FIG. 1 illustrates icons I that are displayed when a user uses his/her finger F, which is an operating object, to designate a given point P1 on a display screen 20 displayed by the terminal apparatus 10. The icons I are an example of display objects associated with predetermined functions, and have a shortcut function to execute the predetermined function. The icons I are arranged at positions that allow one of the icons I to be identified when a direction is designated from the designated point P1. As an example of the arrangement, the designated point P1 is surrounded. The icons I may be, for example, arranged on a circle that surrounds the designated point P1. FIG. 1 illustrates an example in which the icons I are arranged on a circle C1 substantially centered at the designated point P1. As an example of the arrangement of the icons I, a triangle, a polygon including a quadrangle, and an so ellipse are included in addition to a circle. It is needless to say, examples of the arrangement also include circles, polygons, and ellipses a part of which is missing.

In this way, the icons I are arranged such that any one of the icons I is identified when a direction from the designated point P1 is indicated. A user designates a given point P1 on the display screen 20 and designates any one of the directions from the point P1, so that the user can execute a desired function. In view of the operability for users, it is desired to execute a desired function in as small a movement as possible. Thus, a method disclosed in the present disclosure is more preferable in terms of the operability than approaches that use a screen on which the icons I are arranged at predefined positions and that prompt users to select a desired item from a hierarchical menu step by step because the method disclosed in the present disclosure requires smaller movements from users.

As illustrated in FIG. 2, for example, the given point P1 may also be designated on a home screen 20A. In addition, the given point P1 may also be designated on an application execution screen or a navigation screen 20B as illustrated in FIG. 3, for example. A group of icons I on a circle C1-A displayed on the home screen 20A and a group of icons I on a circle C1-B displayed on the navigation screen 20B may be made of a combination of icons I that are of different types.

<2. Functional Configuration Example>

Figure 4:
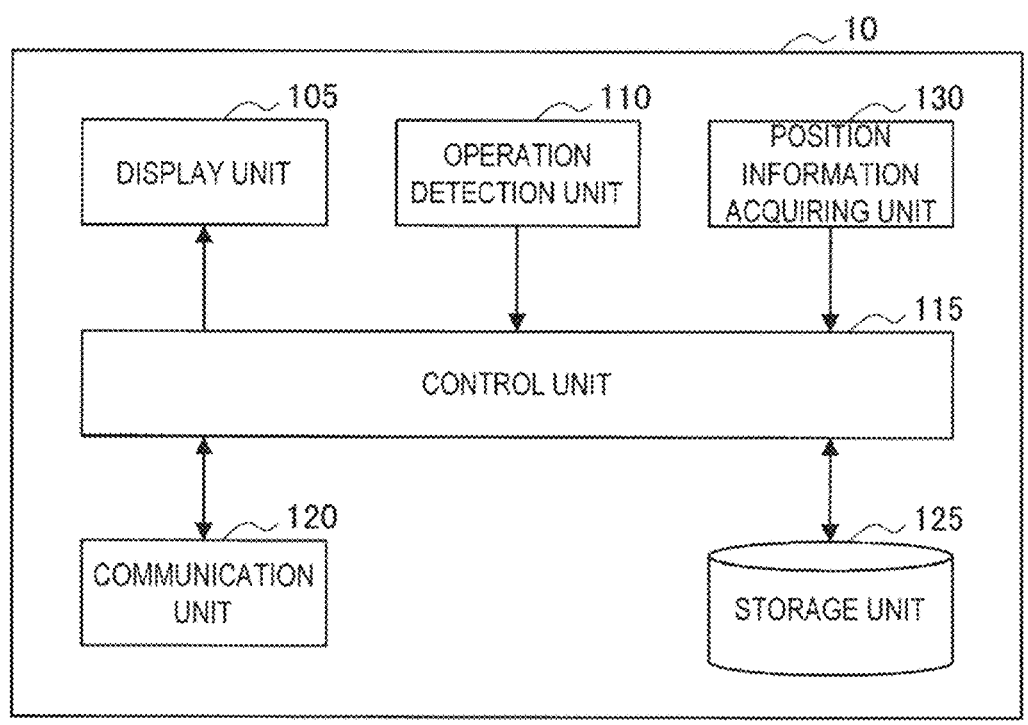
FIG. 4 is a block diagram illustrating a functional configuration example of the terminal apparatus according to the present embodiment.
Figure 5:
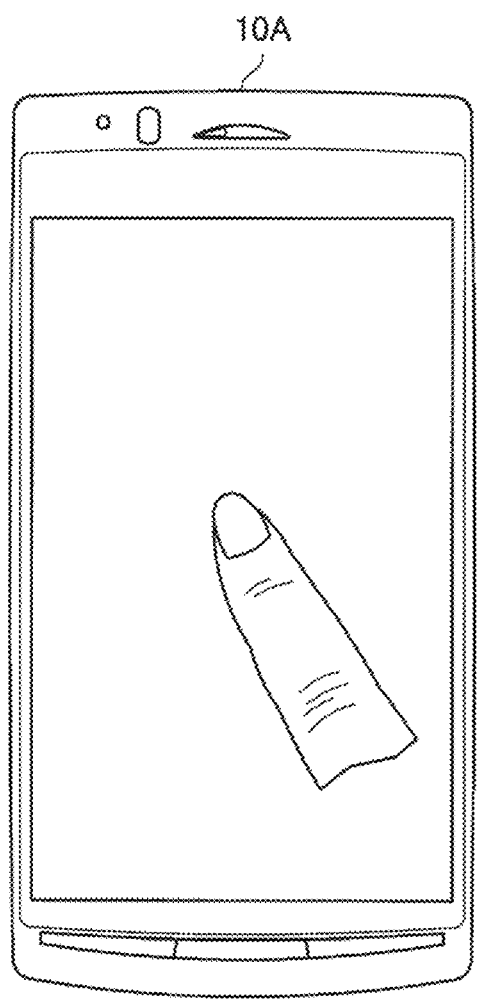
FIG. 5 is an explanatory diagram illustrating a first example of an external appearance of the terminal apparatus according to the present embodiment.
Figure 6:
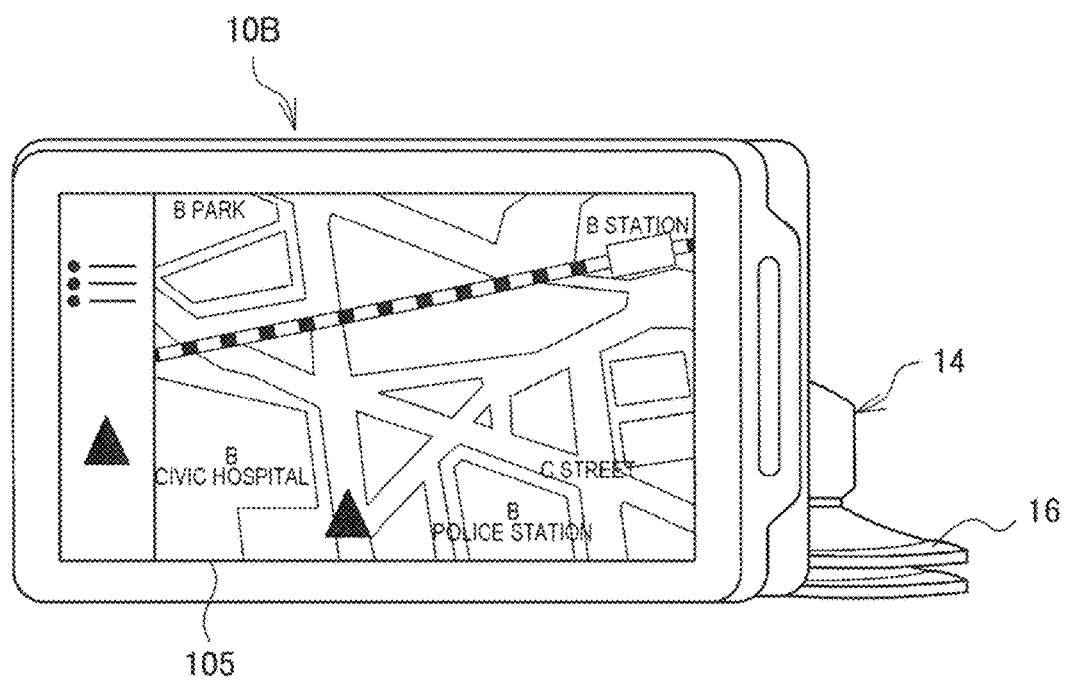
FIG. 6 is an explanatory diagram illustrating a second example of the external appearance of the terminal apparatus according to the present embodiment.

Next, a functional configuration example of the terminal apparatus 10 according to an embodiment of the present disclosure will be described with reference to FIGS. 4 to 6. FIG. 4 is a block diagram illustrating a functional configuration example of the terminal apparatus according to the present embodiment. FIG. 5 is an explanatory diagram illustrating a first example of an external appearance of the terminal apparatus according to the present embodiment. FIG. 6 is an explanatory diagram illustrating a second example of the external appearance of the terminal apparatus according to the present embodiment.

FIG. 4 shows that the terminal apparatus 10 primarily includes a display unit 105, an operation detection unit 110, a control unit 115, a communication unit 120, a storage unit 125, and a position information acquiring unit 130.

(Display Unit 105)

The display unit 105 is an example of an output device, and may also be a display device such as a liquid crystal display (LCD) device and an organic electroluminescence display (OELD) device. Alternatively, the display unit 105 may also be a projector that projects an image. The display unit 105 can control an image to be displayed under the control of the control unit 115.

(Operation Detection Unit 110)

The operation detection unit 110 has a function of detecting an input operation of a user. The operation detection unit 110 may include an input unit such as a touch sensor, a mouse, a keyboard, a button, a microphone, a switch, and a lever with which a user inputs information, and an input control circuit that generates an input signal on the basis of the input from the user. Alternatively, the operation detection unit 110 may receive an input signal generated by a separate operation unit, and then detect the operation.

(Control Unit 115)

The control unit 115 has a function of controlling the whole operation of the terminal apparatus 10. The control unit 115 may have, for example, a display control function of controlling the operation of the display unit 105. Alternatively, the control unit 115 may be able to function as a navigation unit that provides a navigation function by using current position information supplied from the position information acquiring unit 130 and map data stored in the storage unit 125. The control unit 115 can also function as a communication control unit that controls transmission of information to and reception of information from an external apparatus by controlling the communication unit 120. The details about the control of the control unit 115 will be discussed below.

(Communication Unit 120)

The communication unit 120 is a communication device used for a connection to a network, and includes, for example, a communication card for a wired or wireless local area network (LAN), Bluetooth (registered trademark) or a wireless USB (WUSB), a rooter for optical communication, a rooter for an asymmetric digital subscriber line (ADSL), or a modem for various communication. A network that connects to the communication unit 120 includes a network that establishes a wired or wireless connection such as the Internet, a home LAN, infrared communication, visible light communication, and broadcast or satellite communication.

(Storage Unit 125)

The storage unit 125 is a device for data storage, and can include a storage medium, a recording device that records data on a storage medium, a read-out device that reads out data from a storage medium, and a deletion device that deletes data recorded on a recording medium. For example, nonvolatile memory such as flash memory, magnetoresistive random access memory (MRAM), ferroelectric random access memory (FeRAM), phase change random access memory (PRAM) and electronically erasable and programmable read only memory (EEPROM), and a magnetic recording medium such as a hard disk drive (HDD) may be used as a storage medium.

(Position Information Acquiring Unit 130)

The position information acquiring unit 130 has a function of acquiring current position information. For example, the position information acquiring unit 130 may include a global positioning system (GPS) antenna and a GPS processing unit that calculates position information from a GPS reception signal. Alternatively, the position information acquiring unit 130 may have an autonomous positioning function with various sensors. The position information acquiring unit 130 may so also estimate distances between base stations and the terminal apparatus 10 from the reception strength of Wi-Fi radio waves received from the base stations, and then calculate current position information from the estimated distance and position information on each base station. The position information acquiring unit 130 may use various indoor positioning techniques to acquire position information. Examples of the indoor positioning techniques include the Indoor Messaging System (IMES) also called indoor GPS, visible light communication, infrared communication, a radio frequency identification (RFID) tag, a Quick Response (QR) code, and Bluetooth (registered trademark). The position information acquiring unit 130 may use charging information and regard the location of an actual shop that charges a user as the current position of the user at the time of charging. The position information acquiring unit 130 may also use check-in information and regard the location of a building in which a user checks as the current position of the user at the time of the check-in.

The terminal apparatus 10 may be a mobile phone 10A as illustrated in FIG. 5, or may also be a personal navigation device (PND) 10B as illustrated in FIG. 6. The PND 10B has a navigation function as the main function, and may be able to adhere to a vehicle via a cradle 14 and a sucker 16, for example. Each of the mobile phone 10A and the PND 10B has a touch sensor, which is here the operation detection unit 110, superimposed on a display unit 105. An operating object (such as a finger F of a user) moves on the screen, allowing a desired operation to be input. This is, however, an example for implementing the technical ideas of the present disclosure. Needless to say, the present disclosure is not limited thereto.

The example of the function of the terminal apparatus 10 according to the present embodiment has been shown so far. The structural elements that have been described above may be formed of general-purpose members and circuits, or of hardware specialized for the function of each structural element. A control program having a processing procedure for a processing device such as a central processing unit (CPU) to implement the function of each structural element may be read out so from a storage medium such as read only memory (ROM) and random access memory (RAM) storing the control program, and then the program may be interpreted and executed in order to perform the function of each structural element. Thus, a configuration used can be modified as appropriate according to the technological level at the time of the implementation of the present embodiment.

It is possible to make a computer program for implementing each function of the terminal apparatus 10 according to the present embodiment as mentioned above, and then implement the computer program in a personal computer. There can also be provided a computer-readable recording medium having the computer program stored therein. Examples of the recording medium include magnetic disks, optical discs, magneto-optical disks, and flash memory. The computer program may also be distributed via a network, for example, using no recording medium.

<3. Display of Icons>

Figure 7:
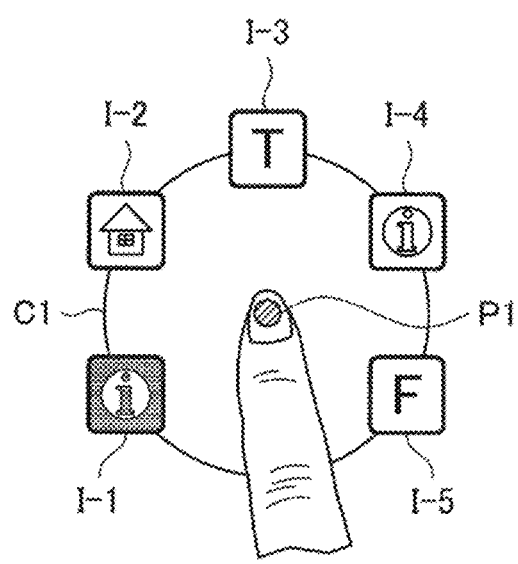
FIG. 7 is an explanatory diagram illustrating an example of arrangement of icons displayed by the terminal apparatus according to the present embodiment.
Figure 8:
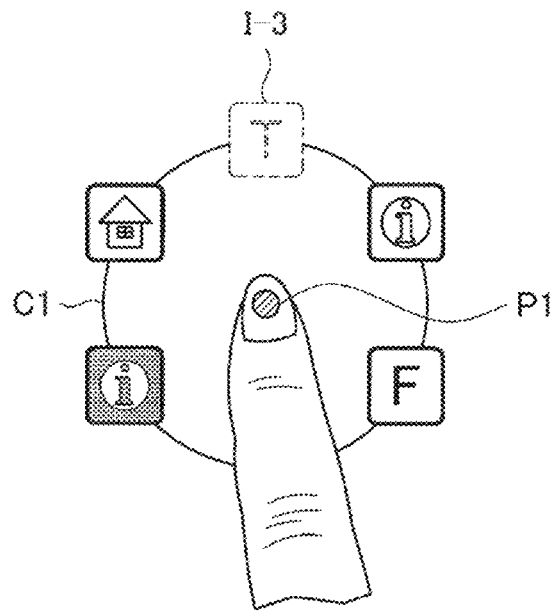
FIG. 8 is an explanatory diagram illustrating examples of display forms of icons displayed by the terminal apparatus according to the present embodiment.
Figure 8:
Figure 8:
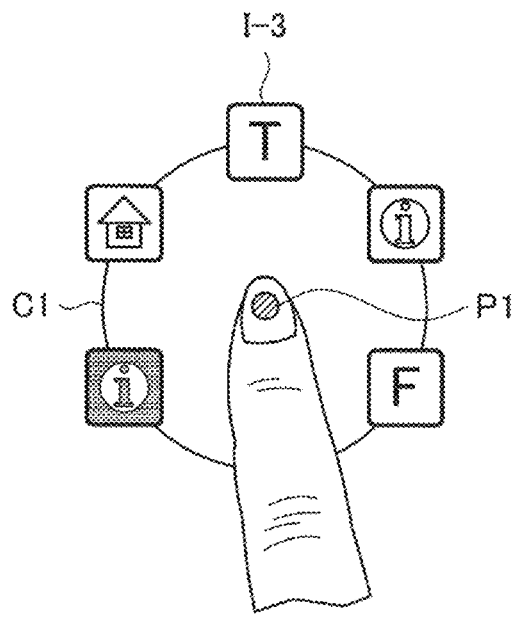
Figure 9:
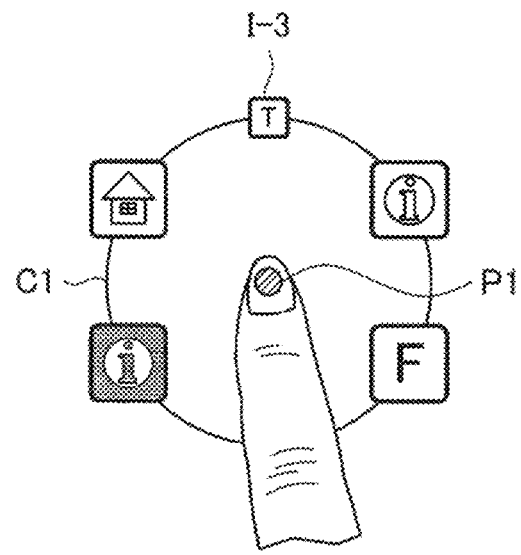
FIG. 9 is an explanatory diagram illustrating other examples of the display forms of icons displayed by the terminal apparatus according to the present embodiment.
Figure 9:
Figure 9:
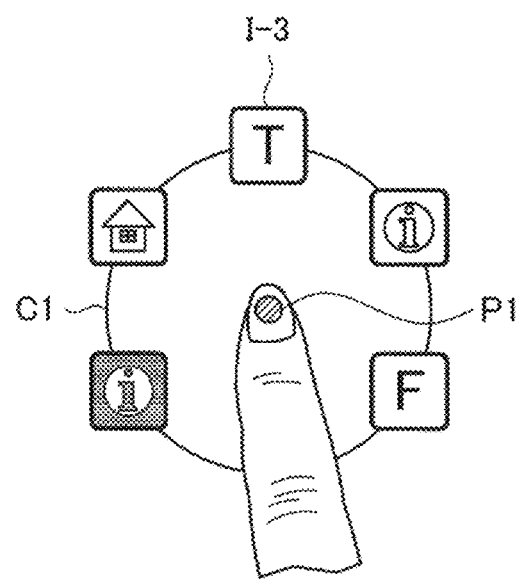
Figure 10:
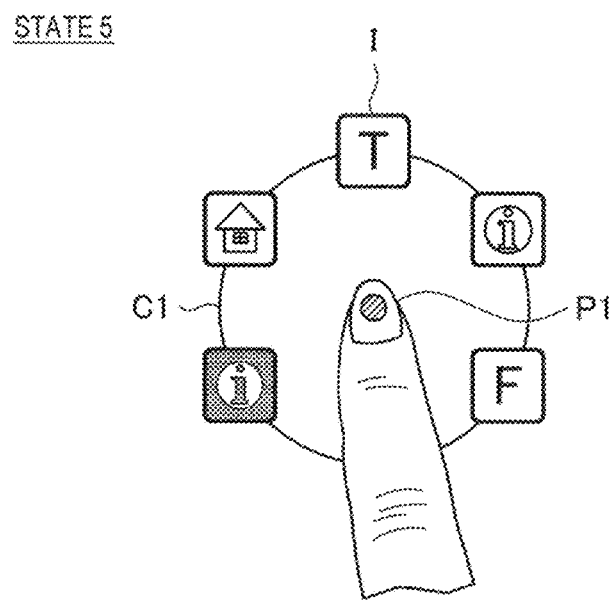
FIG. 10 is an explanatory diagram illustrating a ring representation example of icons displayed by the terminal apparatus according to the present embodiment.
Figure 10:
Figure 10:
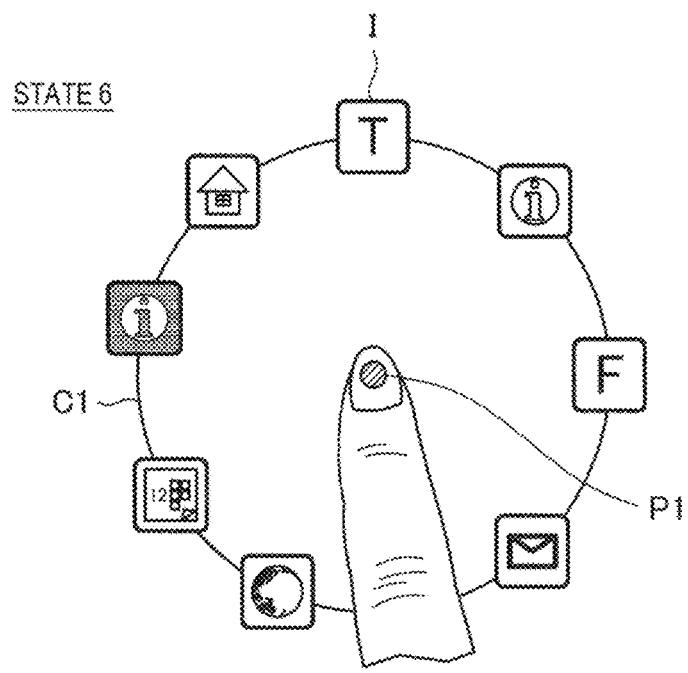
Figure 11:
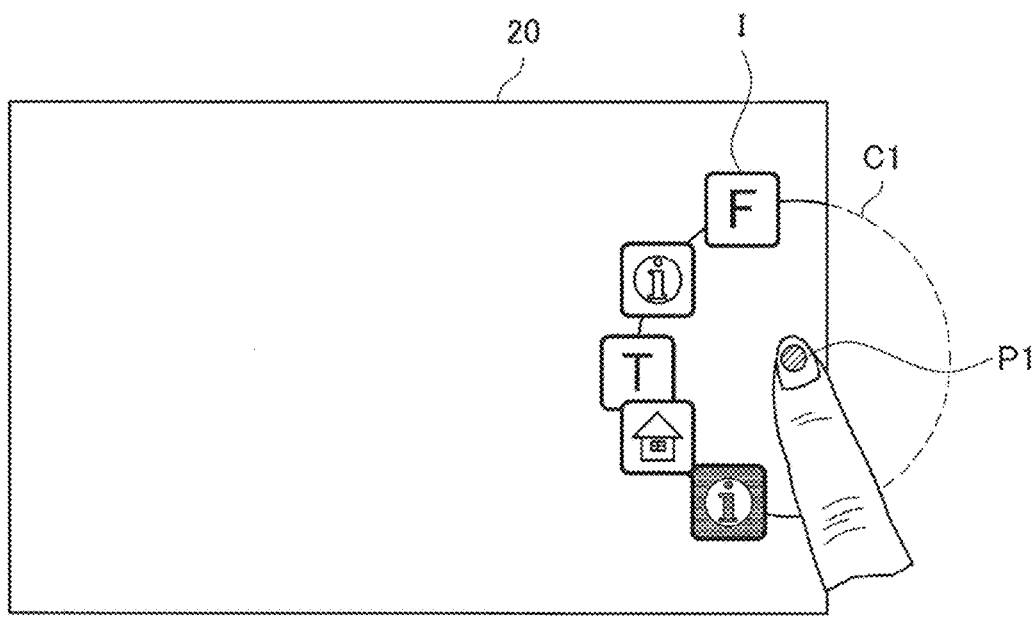
FIG. 11 is an explanatory diagram illustrating examples of display forms of of icons displayed at a peripheral part of a display screen by the terminal apparatus according to the present embodiment.
Figure 11:
Figure 11:
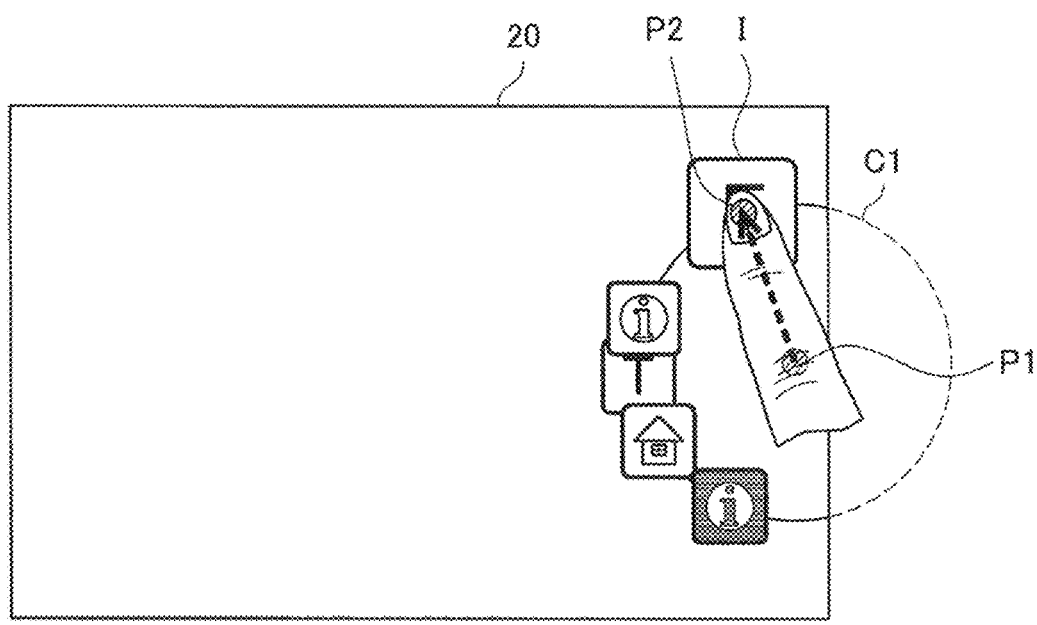

Next, the display of icons when the terminal apparatus 10 according to the present embodiment detects an input of a given point P1 will be described with reference to FIGS. 7 to 11. FIG. 7 is an explanatory diagram illustrating an example of arrangement of icons displayed by the terminal apparatus according to the present embodiment. FIG. 8 is an explanatory diagram illustrating examples of display forms of icons displayed by the terminal apparatus according to the present embodiment. FIG. 9 is an explanatory diagram illustrating other examples of the display forms of icons displayed by the terminal apparatus according to the present embodiment. FIG. 10 is an explanatory diagram illustrating a ring representation example of icons displayed by the terminal apparatus according to the present embodiment. FIG. 11 is an explanatory diagram illustrating examples of display forms of icons displayed at a peripheral part of a display screen by the terminal apparatus according to the present embodiment.

The description will be made on a process for displaying icons I that the control unit 115 displays when the operation detection unit 110 of the terminal apparatus 10 detects an input of a given point P1. As described with reference to FIG. 1, the control unit 115 causes the display unit 105 to display the icons I on the circle C1 substantially centered at the detected given point P1. For example, as illustrated in FIG. 7, the group of icons I that are displayed here include a first icon I-1 for executing a function of displaying notice information acquired via a network, a second icon I-2 for displaying a home screen, a third icon I-3 for executing a function of acquiring and displaying information such as posted messages via a network, a fourth icon I-4 for executing a function of displaying notice information stored in the terminal apparatus 10, and a fifth icon I-5 for executing a function of acquiring and displaying information such as posted messages via the network. Once a finger F is lifted off the display screen 20, the display of the group of icons I is called off.

The group of icons I are arranged on the circle C1, for example, and a direction is indicated from the designated point P1, so that any one of the icons I is identified. When the indication of a direction identifies any one of the icons I, the control unit 115 can temporarily execute the function of the identified icon I. The control unit 115 can, for example, temporarily display information displayed by the identified icon I. Regarding the temporarily displayed information, a user, for example, may decide the execution of the function of the icon I by lifting his/her finger F off the icon I. In other words, when a user selects any one of the icons I, the function of the icon I is temporarily executed. When the user then keeps his/her finger F in contact with the display screen 20 and lifts his/her finger F off the icon I, the selection of the executed function is not decided. Thus, the user keeps his/her finger F in contact with the display screen 20 and selects the icons I one by one, so that the user can temporarily execute the function of each icon I.

When the function executed by the icon I acquires information via a network, the selection of the icon I does not execute the function of the icon I until the information to be displayed has been acquired. Thus, an increase in waiting time of a user lowers the operability. Accordingly, the control unit 115 can alternately display icons I for information that is acquired via a network and then displayed, and icons I for information to be displayed that has been already stored in the terminal apparatus 10. When a user traces the circle C1, the functions of the selected icons I are executed one by one. The alternate arrangement as described above allows for a decrease in a waiting time of a user.

As illustrated in FIG. 8, the control unit 115 may use different display forms for displaying an icon I for information to be displayed when the icon I is selected that has been already stored in the terminal apparatus 10, and an icon I for information to be displayed that has not yet been stored in the terminal apparatus 10. In other words, the control unit 115 controls display forms of icons I such that a user can identify an icon I for information that can be displayed once the user selects the icon I at that time. FIG. 8 illustrates a state 1 in which information for executing the function of an icon I-3 has not yet been acquired, and a state 2 in which the information for executing the function of the icon I-3 has been already acquired. The control unit 115 can change a display form of the icon I-3 for the acquired information by changing the design of the icon I-3 such as color, shape, and transparency.

As illustrated in FIG. 9, the control unit 115 may make an icon I for information smaller than the other icons, the information being displayed when the icon I is selected, and having not been stored in the terminal apparatus 10. This allows a user to identify an icon I for information that can be displayed once the user selects the icon I at that time. FIG. 9 illustrates a state 3 in which information for executing the function of the icon I-3 has not yet been acquired, and a state 4 in which the information for executing the function of the icon I-3 has been already acquired.

As described with reference to FIGS. 8 and 9, a display form of an icon I is changed before and after information is acquired, thereby allowing a user to identify an icon I for information that can be displayed once the use selects the icon I at that so time. Accordingly, there is less possibility that a user is kept waiting because the information is not displayed even though the user has selected the icon I.

As illustrated in FIG. 10, the size of a circle C1 may be changed in accordance with the number of icons I displayed on the circle C1. In other words, the control unit 115 can increase the size of the circle C1 with an increase in the number of icons I that are displayed. FIG. 10 illustrates a circle C1 in a state 5 in which five icons I are included, and a circle C1 in a state 6 in which eight icons I are included. The size of the circle C1 in the state 6 is greater than the size of the circle C1 in the state 5.

A representation when an operation is performed at the end of a display screen 20 will be described with reference to FIG. 11. When a point P1 designated near the end of the display screen 20 is detected, the control unit 115 cannot display the whole circle C1 within the display screen 20. The control unit 115 may then display icons I at narrowed intervals. The control unit 115 may also overlay the icons I with each other. The control unit 115 may further shrink the icons I in size. As illustrated in the bottom of FIG. 11, when a user performs a dragging operation from the designated point P1 to a point P2 on any one of the icons I, the control unit 115 can make the selected icon I (that namely refers to the icon I including the point P2) larger than the other icons I.

As discussed above, an operation performed near the end of the display screen 20 leads to a smaller area in which the icons I are displayed than an operation performed near the center of the display screen 20 does. Accordingly, the intervals among the icons I are narrowed, the icons are shrunk in size, or some of the icons I are prioritized such that icons I of high priority are enlarged and icons I of low priority are shrunk. This can prevent the operability for users within a limited display area from lowering.

<4. Editing Group of Icons to Be Displayed>

Figure 12:
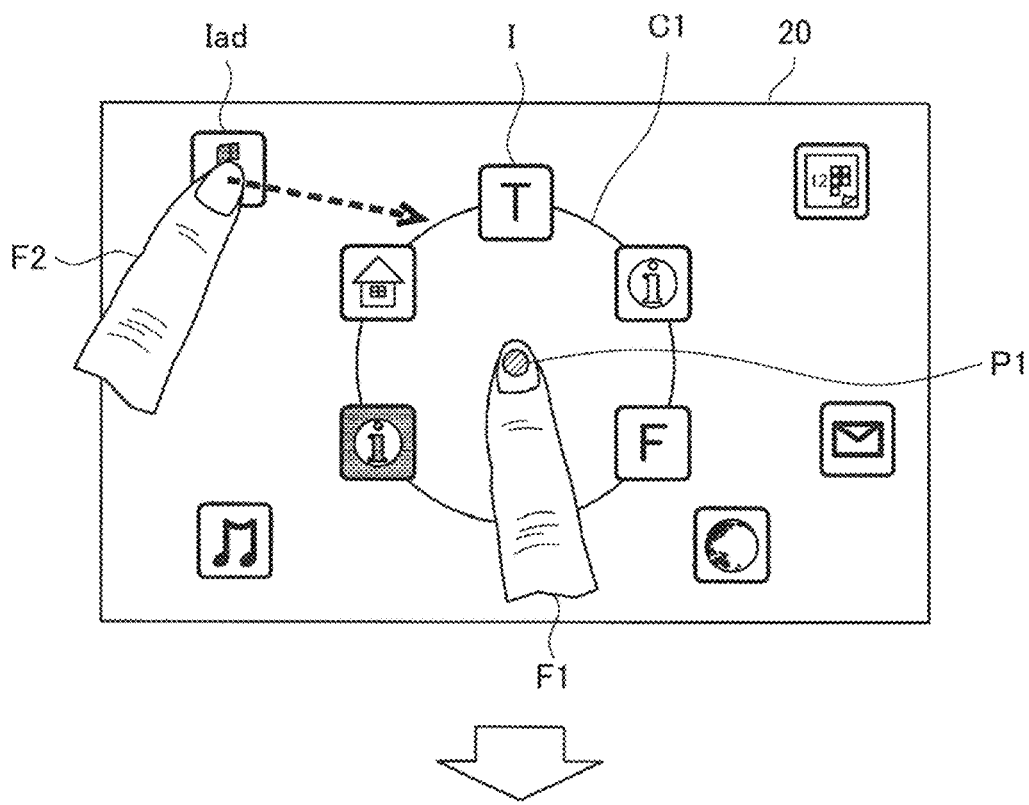
FIG. 12 is an explanatory diagram illustrating an operation of adding an icon to a group of icons displayed by the terminal apparatus according to the present embodiment.
Figure 12:
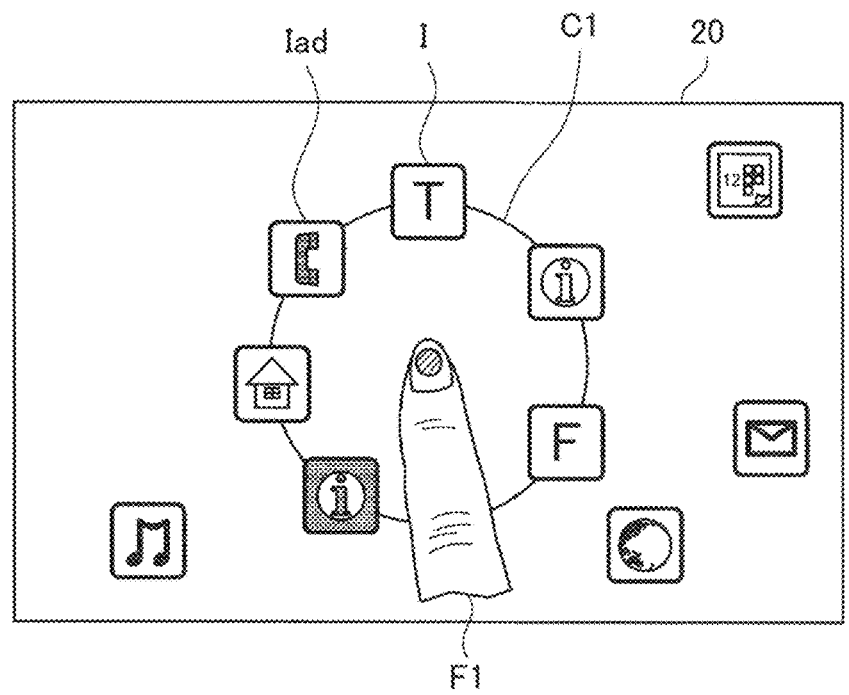
Figure 13:
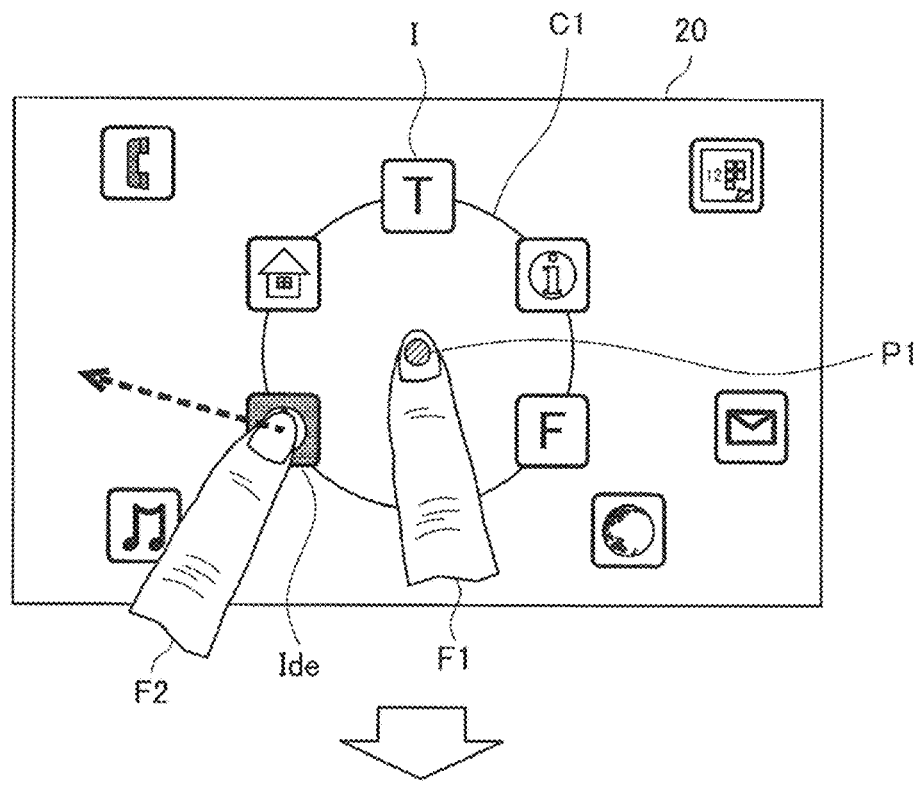
FIG. 13 is an explanatory diagram illustrating an operation of removing an icon from a group of icons displayed by the terminal apparatus according to the present embodiment.
Figure 13:
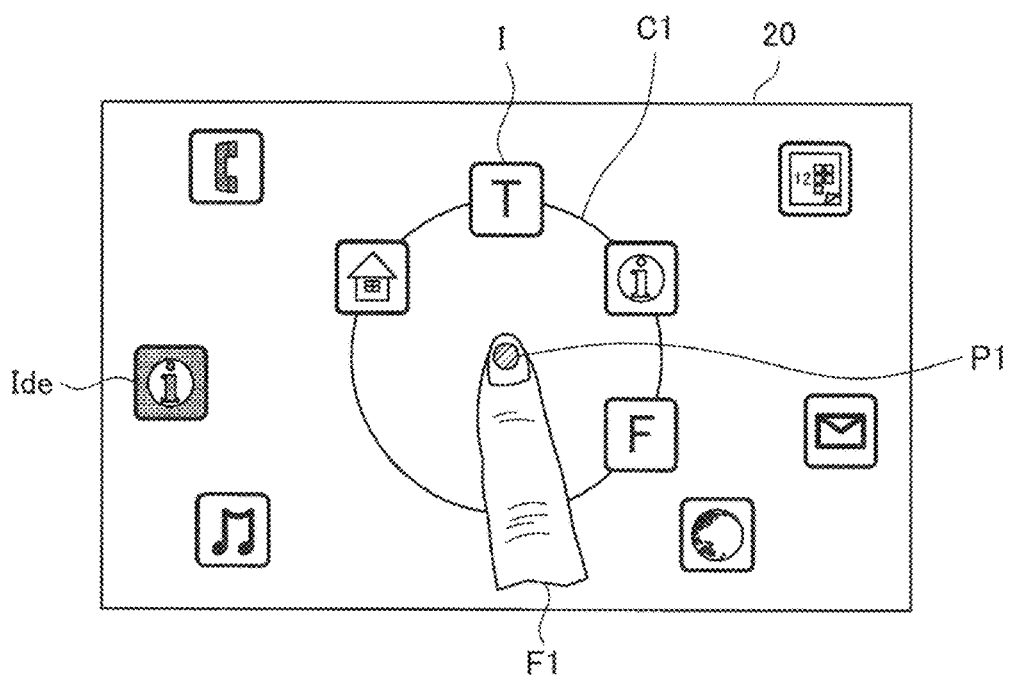

Next, editing a group of icons I to be displayed will be described with reference to FIGS. 12 and 13. FIG. 12 is an explanatory diagram illustrating an operation of adding an icon to a group of icons displayed by the terminal apparatus according to the present embodiment. FIG. 13 is an explanatory diagram illustrating an operation of removing an icon from a group of icons displayed by the terminal apparatus according to the present embodiment.

First, the addition of an icon I to the group of icons I will be described with reference to FIG. 12. When a user designates a given point P1 on a display screen 20, the control unit 115 displays a circle C1 and a group of icons I around the point P1. When the group of icons I are displayed in this way and a user performs a predetermined operation for starting to edit an icon I displayed on the circle C1, the control unit 115 displays an icon I to be added to the group of icons I displayed on the circle 1. When a user selects and drags an icon $I_{ad}$ to be added and then drops the icon $I_{ad}$ on the circle C1, the icon $I_{ad}$ is added onto the circle C1 as illustrated in the bottom.

An operation of removing an icon I from a circle C1 will be described with reference to FIG. 13. When a user designates a given point P1 on a display screen 20, the control unit 115 displays a circle C1 and a group of icons I around the point P1. When the group of icons I are displayed in this way and a user performs a predetermined operation for starting to edit an icon I displayed on the circle C1, the control unit 115 displays an icon I to be added to the group of icons I displayed on the circle C1. Among the icons I displayed on the circle C1, a user selects an icon $I_{de}$ that the user would like to remove from the circle C1, and drags the icon $I_{de}$ out of the circle C1. The selected icon $I_{de}$ is then removed from the circle C1. When a user can intuitively edit the group of icons I displayed on the circle C1 in this way, the operability for the user is enhanced.

<5. Selection of Icon>

Figure 14:
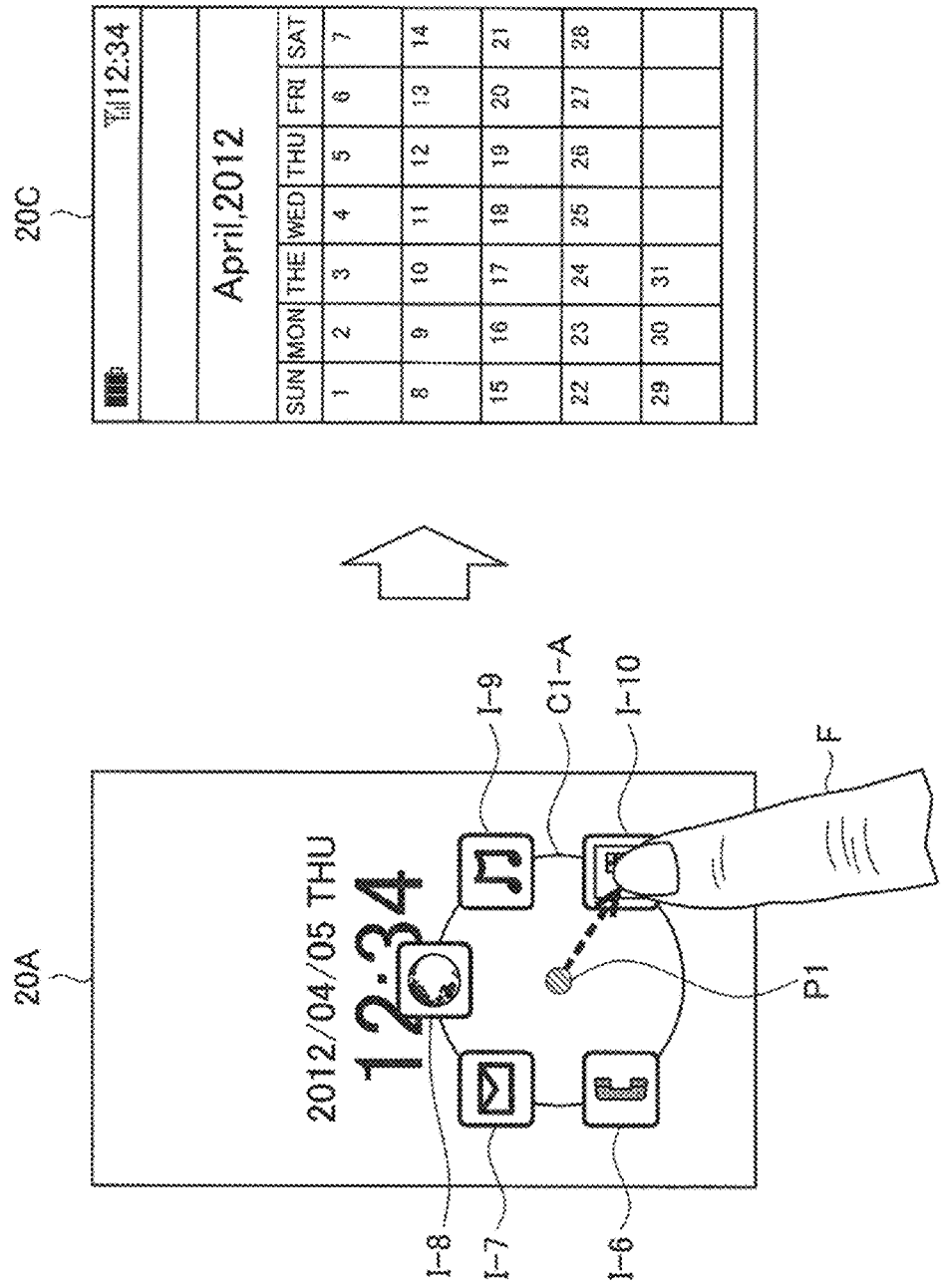
FIG. 14 is an explanatory diagram illustrating an example of an operation in detection of an operation of designating an icon on a home screen displayed by the terminal apparatus according to the present embodiment.
Figure 15:
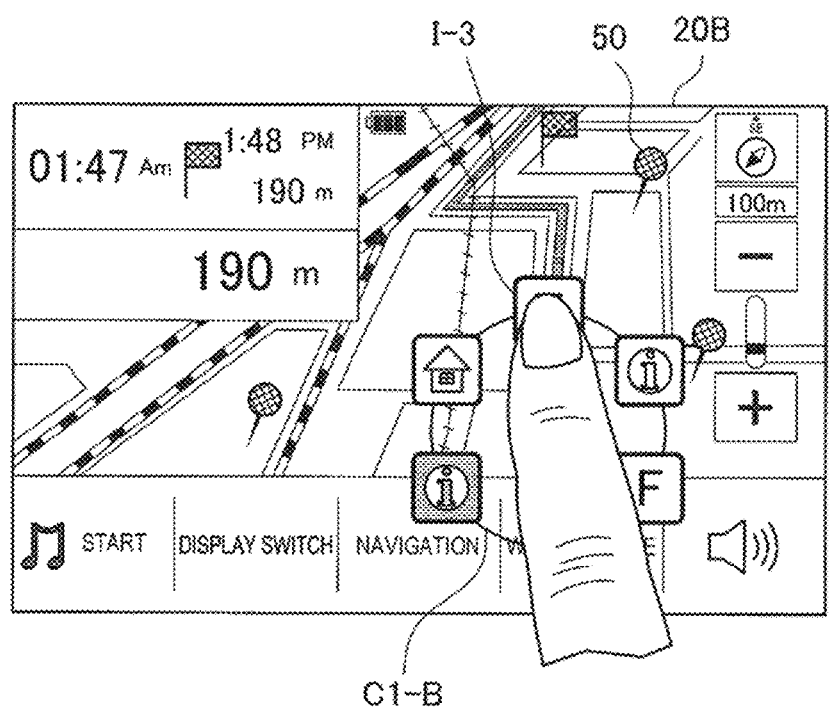
FIG. 15 is an explanatory diagram illustrating an example of an operation in detection of an operation of designating an icon on a navigation screen displayed by the terminal apparatus according to the present embodiment.
Figure 16:
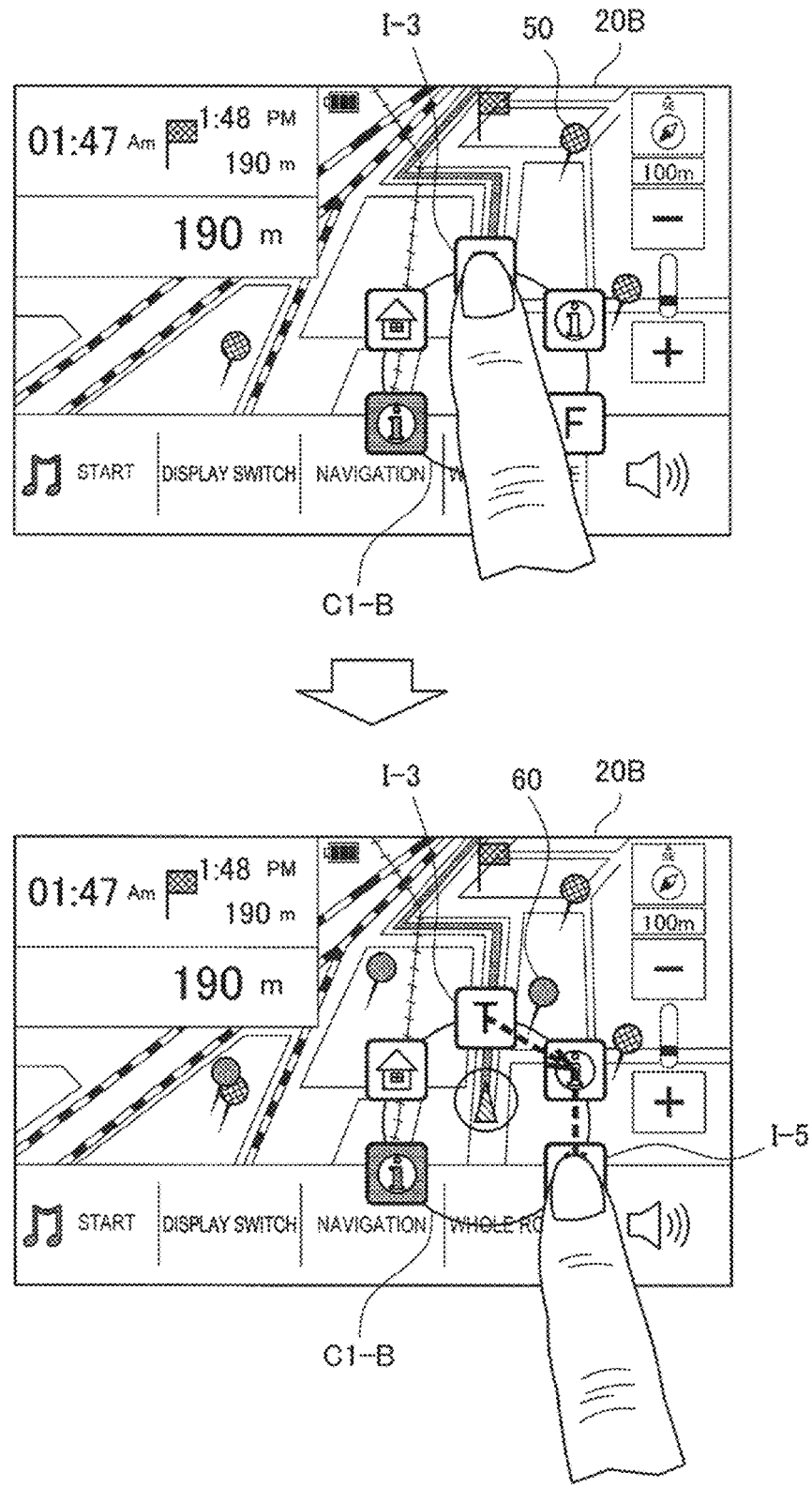
FIG. 16 is an explanatory diagram illustrating an example of an operation in an operation of designating another icon after the detection of the operation of designating the icon on the navigation screen displayed by the terminal apparatus according to the present embodiment.
Figure 17:
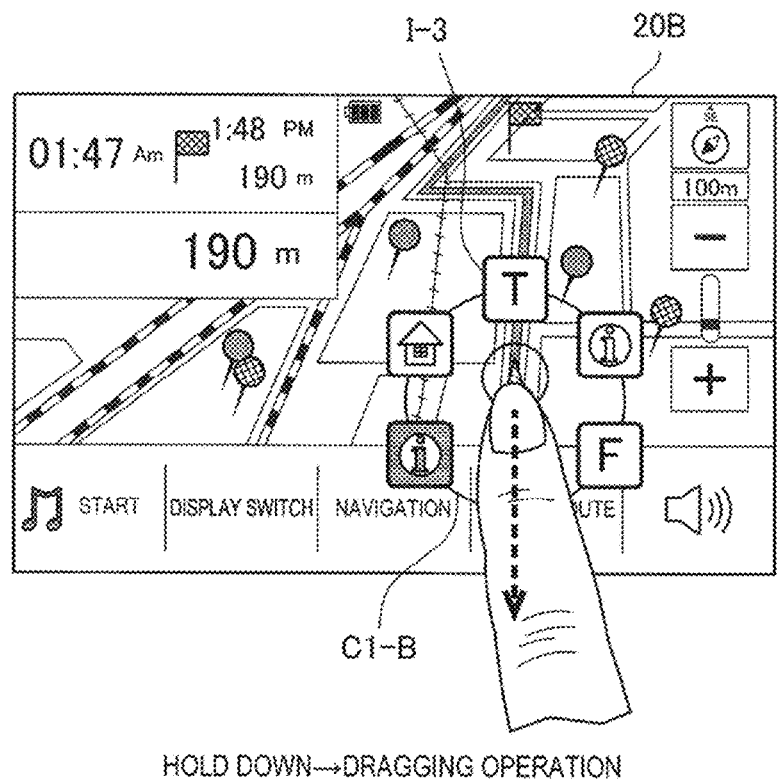
FIG. 17 is an explanatory diagram illustrating an example of an operation of deleting information displayed by the terminal apparatus according to the present embodiment in accordance with designation of an icon.
Figure 17:
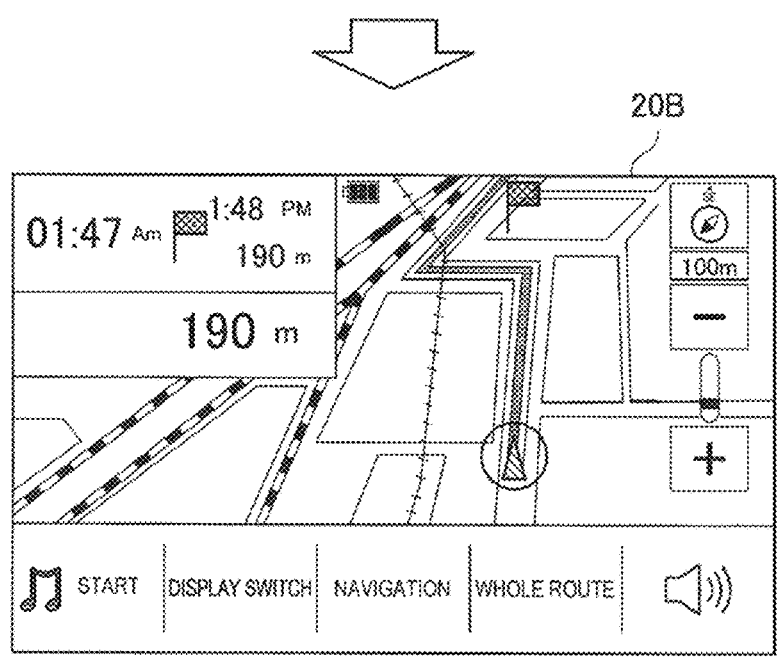
Figure 18:
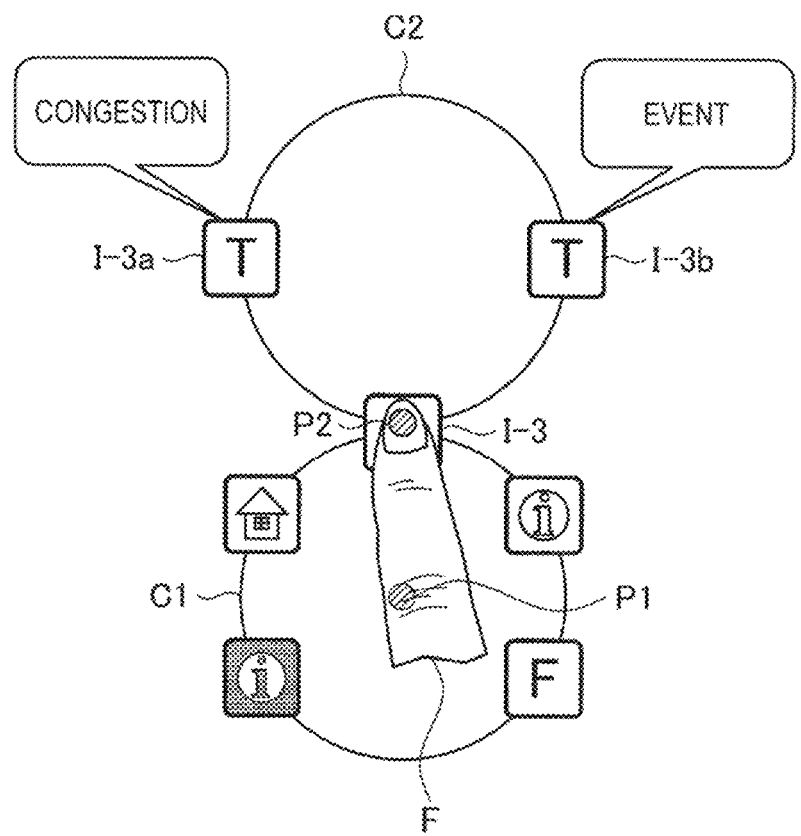
FIG. 18 is an explanatory diagram illustrating an example of a second ring displayed when an icon is designated from a group of icons in a first ring displayed by the terminal apparatus according to the present embodiment.

Next, the description will be made with reference to FIGS. 14 to 18 regarding an operation when the terminal apparatus 10 according to the present embodiment performs a selection operation on a group of icons I displayed in designating a given point P1. FIG. 14 is an explanatory diagram illustrating an example of an operation in the detection of an operation of designating an icon on a home screen displayed by the terminal apparatus according to the present embodiment. FIG. 15 is an explanatory diagram illustrating an example of an operation in the detection of an operation of designating an icon on a navigation screen displayed by the terminal apparatus according to the present embodiment. FIG. 16 is an explanatory diagram illustrating an example of an operation in an operation of designating another icon after the detection of the operation of designating the icon on the navigation screen displayed by the terminal apparatus according to the present embodiment. FIG. 17 is an explanatory diagram illustrating an example of an operation of deleting information displayed by the terminal apparatus according to the present embodiment in accordance with the designation of an icon. FIG. 18 is an explanatory diagram illustrating an example of a second ring displayed when an icon is designated from a group of icons in a first ring displayed by the terminal apparatus according to the present embodiment.

First, as illustrated in FIG. 14, a group of icons I displayed on a circle C1-A displayed when a user designates a given point P1 on a home screen 20A include, for example, a sixth icon I-6 for executing a telephone call function, a seventh icon I-7 for executing a mail function, an eighth icon I-8 for executing a browser function, a ninth icon I-9 for executing a music playback function, and a tenth icon I-10 for executing a schedule function. Additionally, the display of the icons is called off once a finger F is lifted off the home screen 20A.

When, for example, a user performs an operation of selecting the tenth icon I-10 from the group of displayed icons I, a schedule screen 20C is displayed. The operation of selecting the tenth icon I-10 may be an operation of designating a direction from the designated point P1 to the tenth icon I-10, for example. For example, when the operation of designating a direction is detected, the control unit 115 may display the schedule screen 20C. Alternatively, the control unit 115 may also display the schedule screen 20C when a finger F is lifted off the tenth icon I-10.

As illustrated in FIG. 15, when a user performs an operation of designating an icon I-3 among a group of icons I displayed on a circle C1-B, information 50 displayed by the selection of the icon I-3 is temporarily displayed, the circle C1-B being displayed when the user designates a given point P1 on a navigation screen 20B. The information 50 is displayed at a particular position on a map. The information 50 may be a display object that indicates the presence of a posted message associated with this position.

A dragging operation with the icon I-3 designated allows a user to change an icon I to be designated. The control unit 115 can temporarily execute the functions associated with icons I designated one by one. For example, when the icon I-5 is designated after the dragging operation, the control unit 115 displays the information 50, which is displayed by the designation of the third icon I-3, and information 60, which is displayed by the designation of the fifth icon I-5. Like the information 50, the information 60 may also be a display object that indicates the presence of a posted message associated with a particular position. Examples of the posted message include word-of-mouth information, diary text, and images associated with that place.

In this way, when the icons are designated one by one, information displayed by the execution of the functions associated with the respective icons I may be overlaid. In this case, as illustrated in FIG. 17, for example, when a user performs a holding-down operation and then performs a dragging operation, the display of the icons I, the information 50, and the information 60 is called off.

When a user designates the icon I-3, that is, when his/her finger F is detected on the icon I-3, the control unit 115 may further display a second circle C2 associated with the designated icon I-3. An icon I-3a and an icon I-3b are displayed on the circle C2. For example, when the icon I-3a shown here is designated, information on congestion in particular is selectively displayed among posted messages. When the icon I-3b shown here is designated, information on an event is selectively displayed among posted messages.

A user may predefine icons I that are displayed on the circle C2. The icons I displayed on the circle C2 may be recommendation information that has been selected on the basis of current position information and the like.

<6. Operation Example>

Figure 19:
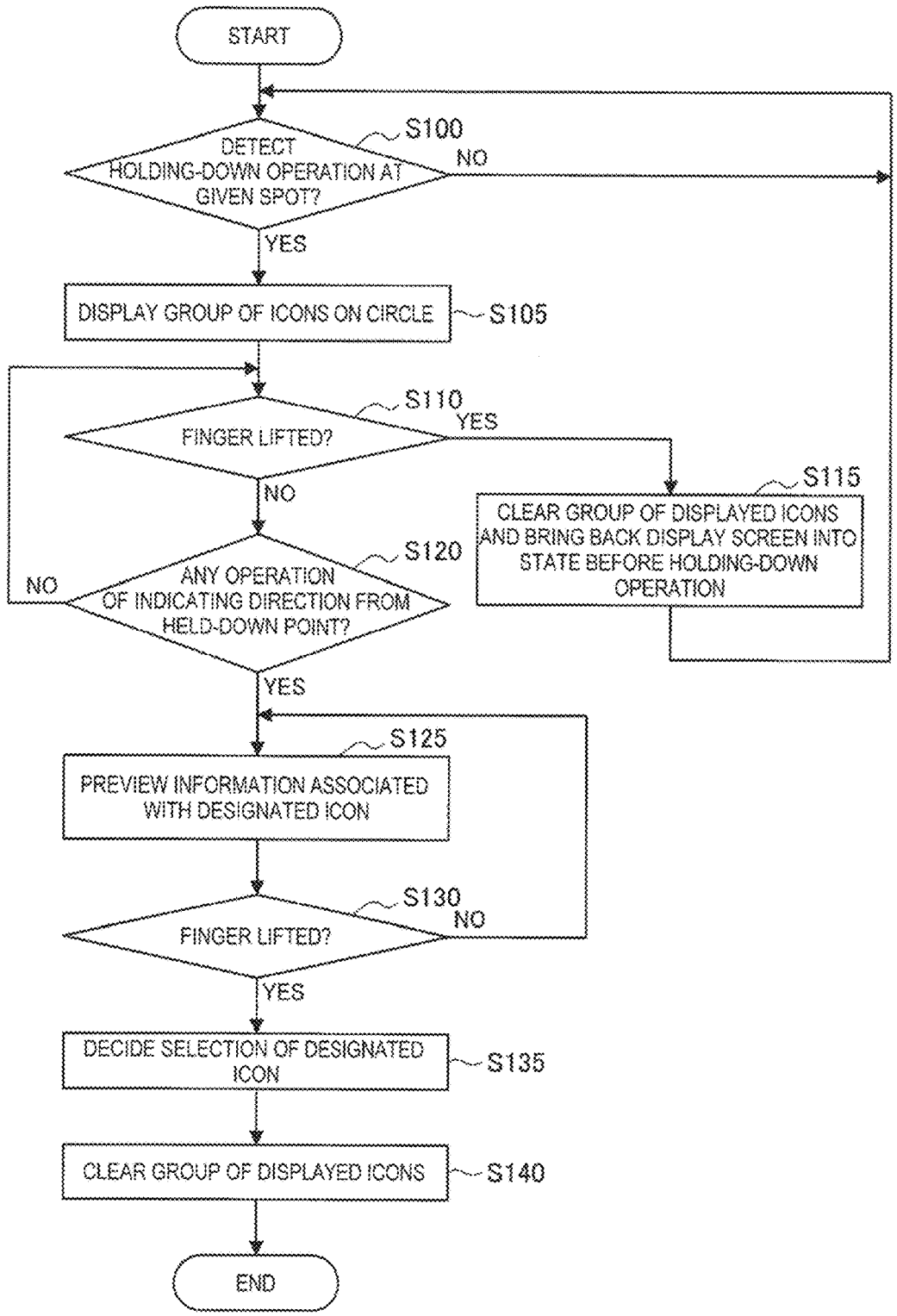
FIG. 19 is a flowchart illustrating an operation example of the terminal apparatus according to the present embodiment.

Next, an operation example of the terminal apparatus 10 according to an embodiment of the present disclosure will be described with reference to FIG. 19. FIG. 19 is a flowchart illustrating an operation example of the terminal apparatus according to the present embodiment.

First, the control unit 115 judges whether the operation detection unit 110 detects an operation of holding down a given spot (S100). If the holding-down operation is detected, the control unit 115 displays a group of icons I on a circle (S105). Next, after the group of icons I are displayed, the control unit 115 judges whether a finger is lifted off the screen (S110). If it is detected that a finger is lifted off the screen, the control unit 115 clears the group of displayed icons I and brings back the display screen into a state before the holding-down operation (S115).

To the contrary, if it is judged that a finger is not lifted, the control unit 115 judges whether an operation of indicating a direction from the held-down point is detected (S120). If an operation of indicating a direction from the held-down point is detected, the control unit 115 then temporarily previews information associated with the icon I designated by the operation of indicating a direction (S125).

The control unit 115 then judges whether a finger is lifted off the screen with any one of the icons I designated (S130). If it is detected that a finger is lifted off the screen, the control unit 115 decides the selection of the designated icon I (S135). Next, the control unit 115 clears the group of displayed icons I (S140).

<7. Hardware Configuration Example>

Figure 20:
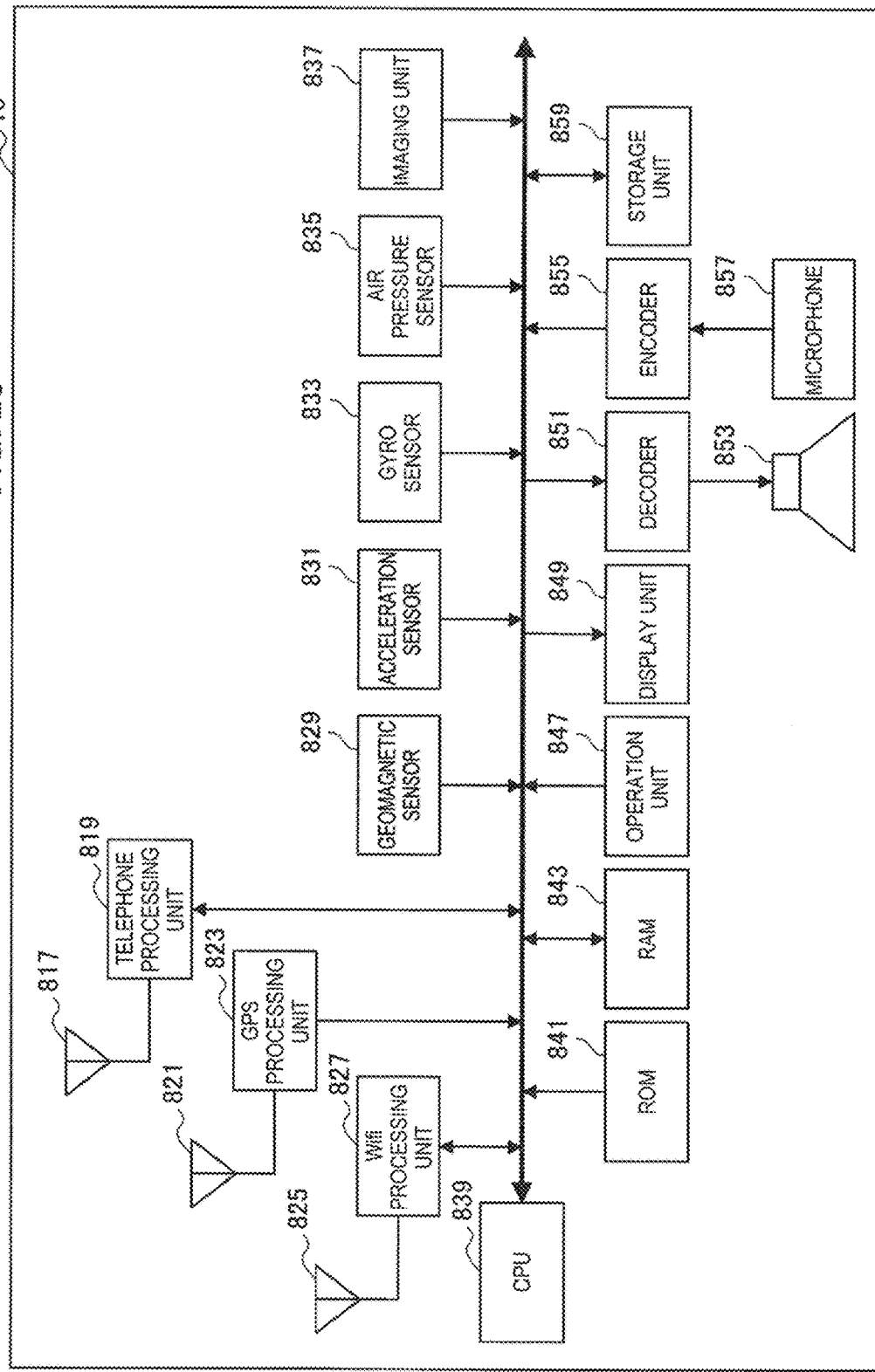
FIG. 20 is a block diagram illustrating a hardware configuration example of the terminal apparatus according to the present embodiment.

Next, a hardware configuration example of the terminal apparatus 10 according to an embodiment of the present disclosure will be described with reference to FIG. 20. FIG. 20 is a block diagram illustrating a hardware configuration example of the terminal apparatus according to the present embodiment.

A configuration example of the terminal apparatus 10 will be now described. FIG. 20 shows that the terminal apparatus 10 includes, for example, a telephone network antenna 817, a telephone processing unit 819, a GPS antenna 821, a GPS processing unit 823, a Wifi antenna 825, a Wifi processing unit 827, a geomagnetic sensor 829, an acceleration sensor 831, a gyro sensor 833, an air pressure sensor 835, an imaging unit 837, a central processing unit (CPU) 839, read only memory (ROM) 841, random access memory (RAM) 843, an operation unit 847, a display unit 849, a decoder 851, a speaker 853, an encoder 855, a microphone 857, and a storage unit 859. The hardware configuration illustrated here is an example. Some of the structural elements may be omitted. There is no need to say that a structural element other than the structural elements illustrated here may be further added.

(Telephone Network Antenna 817)

The telephone network antenna 817 is an example of an antenna having a function of wirelessly connecting to a mobile phone network for telephone call and communication. The telephone network antenna 817 can supply a telephone call signal received via a mobile phone network to the telephone processing unit 819.

(Telephone Processing Unit 819)

The telephone processing unit 819 has a function of performing various signal processing on signals transmitted and received by the telephone network antenna 817. For example, the telephone processing unit 819 can receive an input via the microphone 857, perform various signal processing on an audio signal encoded by the encoder 855, and supply the encoded audio signal to the telephone network antenna 817. The telephone processing unit 819 can also perform various signal processing on an audio signal supplied from the telephone network antenna 819, and supply the audio signal to the decoder 851.

(GPS Antenna 821)

The GPS antenna 821 is an example of an antenna that receives a signal from a positioning satellite. The GPS antenna 821 can receive GPS signals from GPS satellites, and inputs the received GPS signals to the GPS processing unit 823.

(GPS Processing Unit 823)

The GPS processing unit 823 is an example of a calculation unit that calculates position information on the basis of the signals received from the positioning satellites. The GPS processing unit 823 calculates current position information on the basis of the GPS signals input from the GPS antenna 821, and outputs the calculated position information. Specifically, the GPS processing unit 823 calculates the positions of GPS satellites from orbital data of the GPS satellites, and calculates the distances from the respective GPS satellites to the terminal apparatus 10 on the basis of the time difference between the transmission time and the reception time of the GPS signals. The GPS processing unit 823 can then calculate the current three-dimensional position on the basis of the calculated positions of the respective GPS satellites and the distances from the respective GPS satellites to the terminal apparatus 10. The orbital data of the GPS satellites used here may be, for example, included in the GPS signals. Alternatively, the orbital data of the GPS satellites may also be acquired from an external server via the communication antenna 825.

(Wifi Antenna 825)

The Wifi antenna 825 is an antenna having a function of transmitting and receiving a communication signal with a wireless local area network (LAN) communication network, for example, in accordance with the specification of Wifi. The Wifi antenna 825 can supply the received signal to the communication processing unit 827.

(Wifi Processing Unit 827)

The Wifi processing unit 827 has a function of performing various signal processing on the signal supplied from the Wifi antenna 825. The Wifi processing unit 827 can supply a digital signal generated from the supplied analog signal to the CPU 839.

(Geomagnetic Sensor 829)

The geomagnetic sensor 829 is a sensor that detects geomagnetism as a voltage value. The geomagnetic sensor 829 may be a triaxial geomagnetic sensor that detects geomagnetism in the X-axial direction, the Y-axial direction, and the Z-axial direction. The geomagnetic sensor 829 can supply data of the detected geomagnetism to the CPU 839.

(Acceleration Sensor 831)

The acceleration sensor 831 is a sensor that detects acceleration as a voltage value. The acceleration sensor 831 may be a triaxial acceleration sensor that detects acceleration along the X-axial direction, acceleration along the Y-axial direction, and acceleration along the Z-axial direction. The acceleration sensor 831 can supply data of the detected acceleration to the CPU 839.

(Gyro Sensor 833)

The gyro sensor 833 is a kind of measuring instrument that detects an angle and angular velocity of an object. The gyro sensor 833 may be a triaxial gyro sensor that detects, as voltage values, the changing velocity (angular velocity) of rotational angles with respect to the X-axis, the Y-axis, and the Z-axis. The gyro sensor 833 can supply data of the detected angular velocity to the CPU 839.

(Air Pressure Sensor 835)

The air pressure sensor 835 is a sensor that detects the atmospheric pressure in a nearby area as a voltage value. The air pressure sensor 835 detects the atmospheric pressure at a predetermined sampling frequency, and can supply data of the detected atmospheric pressure to the CPU 839.

(Imaging Unit 837)

The imaging unit 837 has a function of shooting a still image or a moving image via a lens under the control of the CPU 839. The imaging unit 837 may cause the storage unit 859 to store the shot image.

(CPU 839)

The CPU 839 functions as a processing device and a control device, and controls the whole operation of the terminal apparatus 10 in accordance with various programs.

The CPU 839 may also be a microprocessor. The CPU 839 can implement various functions in accordance with various programs.

(ROM 841 and RAM 843)

The ROM 841 can store a program, an operation parameter, and the like used by the CPU 839. The RAM 843 can temporarily store a program used upon the execution of the CPU 839 and a parameter changing as necessary upon the execution.

(Operation Unit 847)

The operation unit 847 has a function of generating an input signal for a user to perform a desired operation. The operation unit 847 may include an input unit such as a touch sensor, a mouse, a keyboard, a button, a microphone, a switch, and a lever used for a user to input information, and an input control circuit that generates an input signal on the basis of the input from the user and then outputs the generated input signal to the CPU 839.

(Display Unit 849)

The display unit 849 is an example of an output device, and may be a display device such as a liquid crystal display (LCD) device and an organic light emitting diode (OLED) display device. The display unit 849 can provide information by displaying a screen for a user.

(Decoder 851 and Speaker 853)

The decoder 851 has a function of decoding and performing analogue conversion on input data under the control of the CPU 839. The decoder 851 can decode and perform analogue conversion on audio data input via the telephone network antenna 817 and the telephone processing unit 819, for example, and then output the audio signal to the speaker 853. The decoder 851 can also decode and perform analogue conversion on audio data input via the Wifi antenna 825 and the Wifi processing unit 827, for example, and then output the audio signal to the speaker 853. The speaker 853 can output a sound on the basis of the audio signal supplied from the decoder 851.

(Encoder 855 and Microphone 857)

The encoder 855 has a function of performing digital conversion on and encoding input data under the control of the CPU 839. The encoder 855 can perform digital conversion on and encode an audio signal input from the microphone 857, and then output the audio data. The microphone 857 can collect a sound, and then output the collected sound as an audio signal.

(Storage Unit 859)

The storage unit 859 is a device for data storage, and can include a storage medium, a recording device that records data on a storage medium, a read-out device that reads out data from a storage medium, and a deletion device that deletes data recorded on a storage medium. For example, a nonvolatile memory such as flash memory, magnetoresistive random access memory (MRAM), ferroelectric random access memory (FeRAM), phase change random access memory (PRAM) and electronically erasable and programmable read only memory (EEPROM), and a magnetic recording medium such as a hard disk drive (HDD) may be used as a storage medium.

<8. Modified Example>

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, although the embodiments have assumed that the control unit 115 functioning as a display control unit displays an icon I on the display unit 105 of the terminal apparatus 10, the present technology is not limited thereto. For example, the display device may also be installed outside the terminal apparatus 10. Alternatively, a display target is not limited to a display screen. An image including an icon I may also be displayed in a space. When an image is displayed in a space, the image may be a three-dimensional image (holography).

Figure 21:
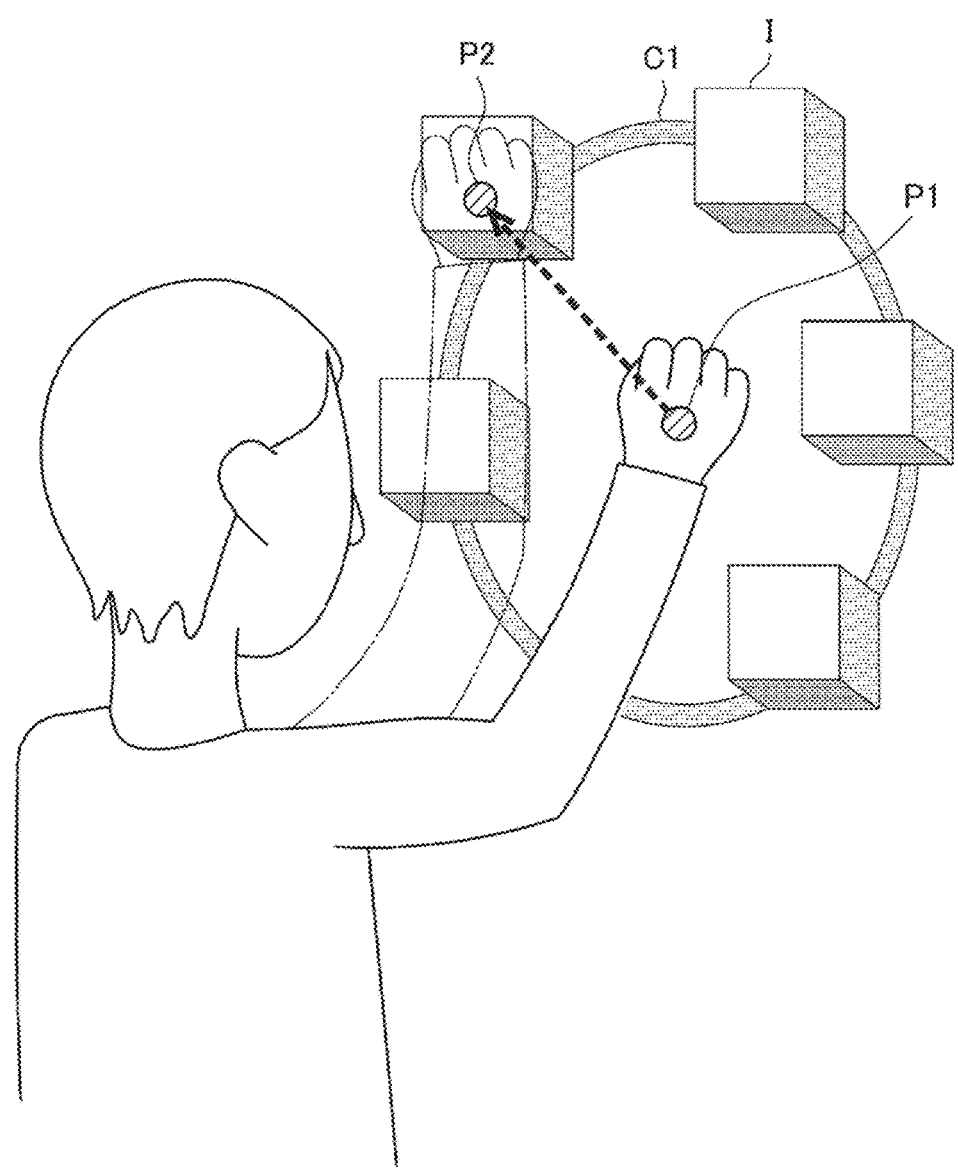
FIG. 21 is an explanatory diagram illustrating an example of three-dimensional images displayed by a terminal apparatus according to a modified example of the present embodiment.

FIG. 21 illustrates an example of a space used as a display target. FIG. 21 is an explanatory diagram illustrating an example of a three-dimensional image displayed by a terminal apparatus according to a modified example of the present embodiment. For example, when a user performs an operation of designating a given point P1 in a space with a hand, a circle C1 may be displayed including icons I around the point P1. The circle C1 may be a circle on a given plane in the space, or may also be three-dimensionally represented as a globe. For example, when a user performs an operation of indicating a direction from the point P1 to a point P2 on any one of the icons I, the function of the icon I identified by the indicated direction is executed. In this case, for example, a given point P1 may be detected by using an so imaging device through an operation detection function.

Although the embodiments have assumed that icons I are displayed on a circle C, the present technology is not limited thereto. For example, icons I may be displayed on a polygon including a triangle and a quadrangle, or on an ellipse.

Although the embodiments have assumed that the terminal apparatus 10 is a smartphone or a PND, the present technology is not limited thereto. The technology of the present disclosure can be applied to any information processing apparatus having a display control function. For example, the terminal apparatus 10 may be an information processing apparatus such as a personal computer (PC), a video processing apparatus, personal digital assistants, a game console, a music player, a mobile phone, and a home appliance.

Although the embodiments have used a home screen and a navigation screen as an example of a display screen on which an operation of displaying a group of icons I is performed, the present technology is not limited thereto. For example, the present technology can also be applied to a screen on which any application other than the navigation function is executed. The control unit 115 can then display icons I that differs for each screen to be operated.

The steps illustrated in the flowcharts in the present description naturally include processes performed in the described and chronological order, and further include processes that are not necessarily performed in chronological order, but are also performed in parallel or are individually performed. Needless to say, it is also possible to change the order as necessary even in the steps for chronologically performing the processes.

Additionally, the present technology may also be configured as below.

(1)

An information processing apparatus including:

a detection unit configured to detect a position of a first point that has been designated; and a control unit configured to display an icon at a position designated by indicating a direction from the first point.

(2)

The information processing apparatus according to (1).

wherein, when a first operation of indicating the direction from the first point is detected, the control unit further displays information associated with the icon to be designated.

(3)

The information processing apparatus according to (1) or (2), wherein, when the first operation of indicating the direction from the first point is detected, the control unit further displays the icon other than the icon to be designated, the icon being associated with the icon to be designated.

(4)

The information processing apparatus according to any one of (1) to (3), wherein, when a second operation of selecting the icon designated by the first operation of indicating the direction from the first point is detected, the control unit executes a function shown by the icon.

(5)

The information processing apparatus according to any one of (1) to (4), wherein the control unit previews information displayed by selection of the icon designated in accordance with the first operation of indicating the direction from the first point.

The information processing apparatus according to any one of (1) to (5), wherein selection of the icon is detected in accordance with a position of an operating object, and wherein, when it is detected that the operating object has stopped operating on the basis of a state in which the position of the operating object is detected on the icon, the control unit decides the selection of the icon.

(7)

The information processing apparatus according to any one of (1) to (6).

wherein the control unit arranges the icons on a circle substantially centered at the first point.

(8)

The information processing apparatus according to (7).

wherein the control unit changes a size of the circle in accordance with a number of the icons to be displayed.

(9)

The information processing apparatus according to any one of (1) to (8), further including:

a storage unit configured to store information, wherein the control unit determines arrangement of the icons on the basis of whether information displayed by the selection of the icon is the information stored in the storage unit.

(10)

The information processing apparatus according to any one of (1) to (9), further including:

a storage unit configured to information.

wherein the control unit changes a display form of the icon in accordance with whether information displayed by the selection of the icon is the information stored in the storage unit.

(11)

The information processing apparatus according to any one of (1) to (10), wherein, when the first point is detected at a peripheral part of a display screen, the control unit displays the icons at a narrowed interval.

(12)

The information processing apparatus according to any one of (1) to (11), wherein, when the first point is detected at the peripheral part of the display screen and a first operation of indicating a direction from the first point designates one of the icons, the control unit makes the designated icon larger than the other icons.

(13)

The information processing apparatus according to any one of (1) to (12), wherein the control unit displays an editing screen on which a combination of the icons is edited, the icons being displayed when the first point is detected, and wherein the combination of icons displayed when the first point is detected is displayed on a circle, and the icon to be added to the combination of icons is displayed outside the circle on the editing screen.

(14)

The information processing apparatus according to any one of (1) to (13), wherein the control unit displays a group of the icons according to a screen on which the first point is detected.

(15)

The information processing apparatus according to any one of (1) to (14), wherein, when the first point is detected on a home screen and a first operation of indicating a direction from the first point is detected, the control unit displays a screen associated with the icon designated by the first operation.

(16)

The information processing apparatus according to (15), wherein, when a screen associated with a first icon that is the icon to be designated is displayed and then an operation of designating a second icon that is the icon other than the first icon is detected, the control unit displays a screen associated with the designated second icon.

(17)

The information processing apparatus according to any one of (1) to (16), wherein, when the first point is detected on a navigation screen and a first operation of indicating a direction from the first point is detected, the control unit superimposes first information associated with the icon designated by the first operation on a spot on a map on the basis of position information in the first information.

(18)

The information processing apparatus according to (17), wherein, when the first information is displayed and then an operation of designating the icon different from the icon associated with the first information is detected, the control unit further superimposes second information associated with the designated icon on the spot on the map on the basis of position information in the second information.

(19)

An information processing method including:

detecting a position of a first point that has been designated; and displaying an icon at a position designated by indicating a direction from the first point.

(20)

A program for causing a computer to function as an information processing apparatus, the information processing apparatus including a detection unit configured to detect a position of a first point that has been designated, and a control unit configured to display an icon at a position designated by indicating a direction from the first point.

REFERENCE SIGNS LIST 10 terminal apparatus (information processing apparatus)
105 display unit
110 operation detection unit
115 control unit
120 communication unit
125 storage unit
130 position information acquiring unit

The invention claimed is:
1. An information processing apparatus, comprising:
one or more processors configured to:
  detect a position of a first point that has been designated;
  control a display unit to display one or more first icons at the position;
  designate a first icon from the one or more first icons through a first operation which indicates a direction from the first point;
  control the display unit to display [[a ]]first information associated with the designated first icon based on a detection of the first operation which indicates the direction from the first point; and
  control the display unit to display one or more second icons which are different from the designated first icon,
    wherein each of the one or more first icons are arranged on a first circle that is centered at the first point,
    wherein the one or more second icons are associated with the designated first icon,
    wherein the one or more second icons are displayed concurrently with the designated first icon, and
    wherein the one or more second icons are arranged on a second circle such that the designated first icon is further arranged on the second circle.

2. The information processing apparatus according to claim 1,
wherein, based on a detection of a second operation to select the designated first icon, the one or more processors are further configured to execute a function shown by the designated first icon.

3. The information processing apparatus according to claim 2,
wherein the one or more processors are further configured to preview the first information displayed by a selection of the designated first icon.

4. The information processing apparatus according to claim 1,
wherein the one or more processors are configured to:
  select the designated first icon from the one or more first icons based on a position of an operating object, and
  based on a detection of a state in which the position of the operating object is detected on the designated first icon, determine the selection of the first icon.

5. The information processing apparatus according to claim 1,
wherein the one or more processors are further configured to change a size of the first circle based on a number of the one or more first icons to be displayed.

6. The information processing apparatus according to claim 1, further comprising:
a storage unit configured to store the first information,
wherein the one or more processors are further configured to determine arrangement of the one or more first icons based on second information that is displayed by a selection of the designated first icon from the one or more first icons and stored in the storage unit.

7. The information processing apparatus according to claim 1, further comprising:
a storage unit configured to store the first information,
wherein the one or more processors are further configured to change a display form of at least one icon among the one or more first icons based on third information that is displayed by a selection of the at least one icon and stored in the storage unit.

8. The information processing apparatus according to claim 1,
wherein, based on a detection of the first point at a peripheral part of the display unit of the information processing apparatus, the one or more processors are further configured to display the one or more first icons at a narrowed interval.

9. The information processing apparatus according to claim 8,
wherein, based on the detection of the first point at the peripheral part of the display unit and designation of the first icon by the first operation, the one or more processors are further configured to make the designated first icon larger than rest of icons among the one or more first icons.

10. The information processing apparatus according to claim 1,
wherein the one or more processors are further configured to control the display unit to display an editing screen on which a combination of the one or more first icons is edited, the one or more first icons are displayed based on the detection of the first point, and
wherein the combination of the one or more first icons is displayed based on the display of the detected first point on the first circle, and an third icon to be added to the combination of the one or more first icons is displayed outside the first circle on the editing screen.

11. The information processing apparatus according to claim 5,
wherein the one or more processors are further configured to control the display unit to display a group of plurality of icons based on a screen on which the first point is detected.

12. The information processing apparatus according to claim 1,
wherein, based on the detection of the first point on a home screen and the detection of the first operation, the one or more processors are further configured to control the display unit to display a screen associated with the designated first icon.

13. The information processing apparatus according to claim 12,
wherein, based on the display of the screen associated with the designated first icon and a detection of a second operation to designate a third icon which is different from the designated first icon, the one or more processors are further configured to control the display unit to display a screen associated with the designated third icon.

14. The information processing apparatus according to claim 4,
  wherein, based on a detection of the first point on a navigation screen and detection of the first operation, the one or more processors are further configured to superimpose the first information associated with the designated first icon on a spot on a map which is displayed on the navigation screen based on first position information included in the first information.

15. The information processing apparatus according to claim 14,
  wherein, based on the display of the first information and detection of a second operation to designate a third icon different from the designated first icon associated with the first information, the one or more processors are further configured to superimpose second information associated with the designated third icon on the spot on the map based on second position information included in the second information.

16. An information processing method, comprising:
  detecting, by one or more processors, a position of a first point that has been designated;
  controlling, by the one or more processors, a display unit to display one or first more icons at the position;
  designating, by the one or more processors, a first icon from the one or more first icons through a first operation which indicates a direction from the first point;
  controlling, by the one or more processors, the display unit to display information associated with the designated first icon based on a detection of the first operation which indicates the direction from the first point; and
  controlling, by the one or more processors, the display unit to display one or more second icons which are different from the designated first icon,
    wherein each of the one or more first icons are arranged on a first circle that is centered at the first point,
    wherein the one or more second icons are associated with the designated first icon,
    wherein the one or more second icons are displayed concurrently with the designated first icon, and
    wherein the one or more second icons are arranged on a second circle such that the designated first icon is further arranged on the second circle.

17. A non-transitory computer-readable medium having stored thereon, computer-executable instructions to cause an information processing apparatus to execute operations, the operations comprising:
  detecting a position of a first point that has been designated,
  displaying one or more first icons at the position,
  designating a first icon from the one or more first icons through a first operation which indicates a direction from the first point,
  displaying information associated with the designated first icon based on a detection of the first operation which indicates the direction from the first point; and
  displaying one or more second icons which are different from the designated first icon,
    wherein each of the one or more first icons are arranged on a first circle that is centered at the first point,
    wherein the one or more second icons are associated with the designated first icon,
    wherein the one or more second icons are displayed concurrently with the designated first icon, and
    wherein the one or more second icons are arranged on a second circle such that the designated first icon is further arranged on the second circle.

* * * * *